United States Patent [19]
Girard et al.

[11] Patent Number: 5,949,350
[45] Date of Patent: Sep. 7, 1999

[54] LOCATION METHOD AND APPARATUS

[75] Inventors: Mark T. Girard, South Haven; Ryan A. Jurgenson; Roger R. Livermore, both of Hutchinson; David R. Swift, Glencoe; Joseph P. Tracy, South Haven, all of Minn.

[73] Assignee: Mobius Innovations, Inc., Glencoe, Mich.

[21] Appl. No.: 08/897,344

[22] Filed: Jul. 21, 1997

[51] Int. Cl.$^6$ .......................... G08B 21/00; G08B 23/00
[52] U.S. Cl. ................. 340/825.49; 340/825.54; 340/539; 340/568; 340/572; 342/454; 342/458
[58] Field of Search .................. 340/825.49, 825.54, 340/825.37, 539, 568, 572, 3; 342/450, 458; 379/38

[56] References Cited

U.S. PATENT DOCUMENTS

| | | | |
|---|---|---|---|
| 4,333,072 | 6/1982 | Beigel | 340/825.54 |
| 4,463,353 | 7/1984 | Kuzara | 340/825.54 |
| 4,918,425 | 4/1990 | Greenberg et al. | 340/539 |
| 4,924,211 | 5/1990 | Davies | 340/573 |
| 5,268,670 | 12/1993 | Brasch et al. | 340/541 |
| 5,568,119 | 10/1996 | Schipper et al. | 340/825.37 |

*Primary Examiner*—William A. Cuchlinski, Jr.
*Assistant Examiner*—Yonel Beaulieu
*Attorney, Agent, or Firm*—Briggs & Morgan, Craig M. Gregersen

[57] ABSTRACT

A system for training an animal to remain in a specified area of containment. The perimeter of containment being easily tailored to fit a specific geometry. The system includes apparatus for determining the location of the animal, apparatus for specifying boundary coordinates, apparatus for determining if the location of the animal is within the containment perimeter, and apparatus for administering stimulus to the animal if warranted.

24 Claims, 18 Drawing Sheets

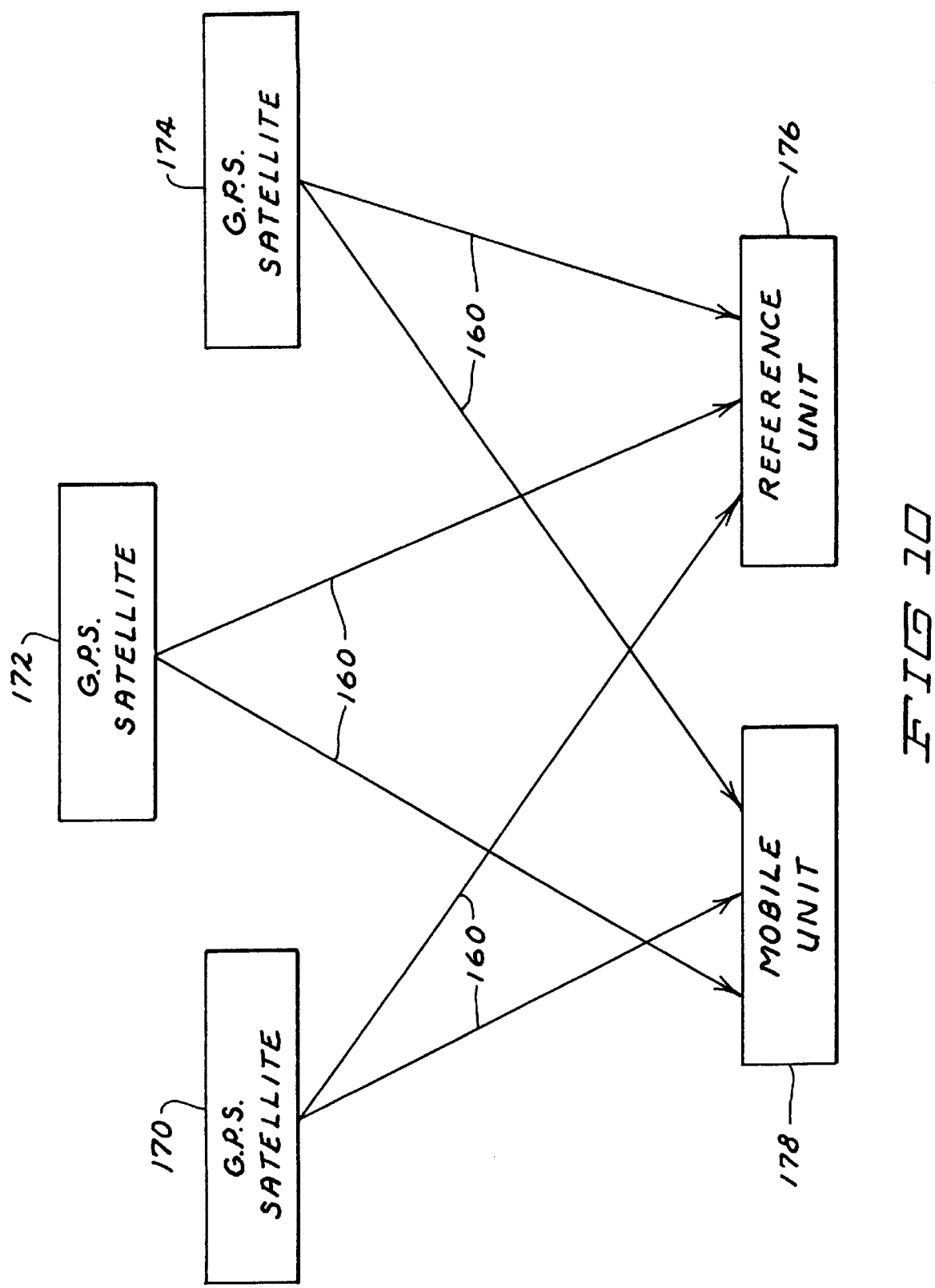

LOCATION METHOD AND APPARATUS

FIELD OF THE INVENTION

The present invention relates generally to systems useful in identifying the location of a mobile transmitter utilizing the global positioning system (GPS) and particularly to such a system useful in creating, operating, and maintaining an animal confinement or containment system.

BACKGROUND OF THE PRESENT INVENTION

Animal confinement systems that provide a stimulus to an animal approaching a predetermined boundary to encourage the animal to remain within the predetermined area defined by the boundary are well known and are commercially available. Generally, there are two such types of systems being sold or otherwise available today—a wire system and a wireless system. The first of these relies on the placement of a transmitter wire above or under ground to define the boundary of a containment area. The transmitter wire transmits an electrical current that in turn sets up an electrical field about the wire. An animal, such as a dog, is equipped with a receiver that senses the electrical field generated by the current in the transmitter wire. The receiver, based upon the strength of the electrical field signal received (and, hence, the distance from the transmitter wire) can be programmed to provide an auditory and/or electrical stimulus. In other words, the receivers worn by the dog typically can be programmed to emit "beeps" at a certain distance from the transmitter wire and/or it can be programmed to provide an electrical shock to the dog when the dog gets within a predetermined distance of the transmitter wire. Usually, the receiver is placed on a collar worn by the dog.

Another known system relies on a single stationary transmitter to broadcast a signal. The transmission is substantially omnidirectional with a substantially uniform signal strength in all directions. The broadcast signal is received by a receiver worn by the dog. Again, the receiver measures the signal strength, determines the distance of the receiver and hence the dog from the transmitter, and applies the appropriate stimulus to the animal if necessary. Conversely, there could exist a centrally located receiver that would receive a signal broadcast by a transmitter worn by the animal. The centrally located transmitter would then measure the signal strength of the broadcast signal and determine whether the animal was approaching the boundary and whether a stimulus should be applied according to pre-determined criteria. This latter variant of such a confinement system would be more expensive than the first variant because it would require a transmitter and a receiver to be placed both on the animal and at the central location, unlike the first, which requires a single transmitter and a single receiver.

A third confinement system that has been proposed relies on ultrasound signal transmissions. With the ultrasound system, a responder worn by the animal is responsive to an ultrasonic signal broadcast by a centrally located transmitter. The distance of the animal from the transmitter is measured by the round trip time of the transmitter signal from the transmitter to the responder and back to the transmitter. When the round trip time indicates that the animal is approaching or within the predetermined stimulus application area, the centrally located ultrasound transmitter will broadcast a signal to the responder directing that a stimulus be applied to the animal. As with the wireless system just described, the ultrasound system also is constrained to use a substantially circular confinement area.

Another wireless system has been proposed that relies on the broadcast and reception of electromagnetic, that is, radio, signals to define the boundary and the stimulus application area. A multiple receiver/multiple antenna unit is worn by the animal. Through a complex vector analysis of the signals received by the unit the exact distance from the animal to the transmitting antenna can be determined and the appropriate stimulus can then be applied. This particular wireless system consumes large amounts of power, necessitating frequent battery recharging and/or replacement in the unit worn by the animal.

Yet another wireless system is known to the prior art. In this system, a transmitter modulates the electromagnetic signals produced by the transmitter to produce non-random patterns of signals. A comparator in the receiver compares the signal levels of the received signals with a predetermined signal level held in memory and produces an output indicative of the signal degradation. The receiver also compares the phase of the modulation of the received signals with a reference phase held in memory. Through additional processing of the output signals the distance of the animal from the transmitter is determined and the appropriate stimulus is applied.

Typically, with either of the afore described systems, some training period is necessary before the animal will learn the boundary beyond which it is not to pass. Often this involves marking the boundary with flags such that the animal will have a visual representation of the boundary to associate with the stimulus received from the collar.

These commercially known systems, while being admirable attempts to devise a workable confinement system for pets, suffer, however, from several notable drawbacks. In the first or wire system, the requirement of the transmitter wire means that the boundary, once placed, is relatively fixed and the system itself is likewise also fixed. In other words, once the wire has been used to define the boundaries, redefining the boundaries requires that the wire be moved, often by digging it up and reburying it. The system suffers, then, from being unable to be moved easily, if at all, so as to define temporary boundaries, such as when a pet is taken on a family vacation.

In addition, when the wire system is used, the homeowner's entire yard effectively cannot be used by the pet. For example, placement of the transmitter wire underground will usually be accomplished entirely on the pet owner's own property, barring excessively good neighborly relations. Since it is typically desired to keep the pet within one's own yard, the stimulus will be applied within several feet of approaching the transmitter wire. In essence, then, an area defined by the yard's perimeter by several feet wide will be unaccessible to the pet. In small yards in particular, this can mean that a substantial percentage of the yard will be inaccessible to the animal for play and exercise.

An additional drawback is that the wire system can be rather expensive when the cost of obtaining the necessary wire to define the area as well as the installation costs are calculated.

Finally, if the confined animal chances to escape the containment area, the animal will receive a warning stimulus if and when it tries to return to the pre-defined area since the stimulus is given when the animal is within a certain distance of the transmitter wire, regardless of which side of the wire it is standing. In other words, as the animal tries to return home, it will receive a stimulus from the receiver as it approaches the transmitter wire and enters the defined distance at which a stimulus will be given. The animal will then be discouraged from coming home if it should happen to escape, thus defeating the purpose of trying to keep the animal within the home yard in the first place.

The wireless systems discussed above, while potentially portable, do not allow for any flexibility in the boundary, which is substantially defined by the directional properties of the transmitter and is most often circular in configuration about the transmitter location. Thus, while a wireless system can be used readily on a vacation to define a pet area, it suffers from the lack of an ability to take advantage of a homeowner's entire yard; or if the entire yard is within the circular containment area, usually a portion of a neighbor's yard is also since rarely, if ever, are yards circularly configured. In addition, particularly with dogs, it is often desired to keep the pet away from a newly planted area, whether lawn or other forms of landscaping. If the newly planted area happens to be within the defined circular boundary, only by redefining the circular boundary to lie closer to the transmitter can the dog be kept away from the newly planted area. Such a boundary redefinition, however, would typically remove a great deal of otherwise useable lawn area from the confinement area, which is rarely an acceptable solution. In other words, the presently available systems do not provide a method of setting off preselected areas where the pet is not allowed within the larger allowable areas where the pet can enter.

Prior art confinement systems can be found in U.S. Pat. Nos. 3,753,421 to Peck; 3,980,051 to Fury; 4,898,120 to Brose; 5,067,441 to Weinstein; and 5,381,129 to Boardman, among others. Reference can be made to those patents and others for a more complete description and understanding of the prior art.

Thus, while the prior art contains many inherent deficiencies, a presently available technology offers the opportunity to develop a more useful system. For example, development of Satellite Positioning Systems (SATPSs), such as the Global Positioning System (GPS) in the United States and the Global Orbiting Navigational System (GLOSNASS) in the former Soviet Union, has allowed location coordinates of an object on or near the Earth to be determined with improved accuracy. Under normal circumstances, these systems allow coordinates to be determined with an accuracy of no more than 30 meters.

A Satellite Positioning System (SATPS) is system of satellite signal transmitters, with receivers located on or near to the earth's surface, that provides means for determining the location of a receiver and/or time of observation. Two operational systems currently in place are the Global Positioning System and the Global Orbiting Navigational System.

The Global Positioning System (GPS) is a satellite-based navigational system developed by the United States Department of Defense. The GPS system employs 24 satellites, 4 of which share one of six orbits around the earth at a radius of 26,560 kilometers and are approximately circular. The system allows that three or more satellites are visible on most points of the earth's surface at any given time. Each satellite carries a cesium or rubidium atomic clock to provide timing information for the transmitted signals.

Each GPS satellite transmits two spread spectrum, L-band carrier signals: an L1 signal having a frequency $f1=1575.42$ MHz. These two frequencies are multiples of a base frequency, $f0=1.023$ MHz. These two transmitted signals allow for partial compensation of propagation delay of such a signal through the ionosphere as put forth by MacDoran in U.S. Pat. No. 4,463,357. The L1 signal is binary phase shift key (BPSK) which is modulated by two psuedo-random noise (PRN) codes. The two PRN codes are modulated in phase quadrature, and are termed C/A-code and P-code. The L2 signal from each satellite is BPSK modulated by only the P-code.

Use of the PRN codes allows use of a plurality of GPS signals. A signal transmitted by a particular GPS satellite is selected by creating and matching the PRN code for that particular satellite. PRN codes for all satellites are known and stored in each GPS satellite signal receiver. A first P-code for each GPS satellite is a relatively lengthy code which includes an associated clock rate of 10 $F0=10.23$ MHz. A second PRN code for each GPS satellite, the C/A code, or clear/acquisition code, is short code which allows for rapid satellite signal acquisition and has a clock rate of $F0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7 days) before this code portion repeats. Accepted methods for generating the C/A code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS techniques for deciphering position information of GPS satellite signals can be found in the NAVSTAR Global Positioning System, Van Nostrand Reinhold, New York, 1992, pp. 1–90.

A second configuration for global positioning is the Global Orbiting Navigation Satellite System (GLONASS), developed by the former Soviet Union. GLONASS also uses 24 satellites, but they are spread evenly over three circular orbits of radii of about 25,510 kilometers. The GLONASS system also uses two carrier signals L1 and L2 with frequencies of $f1=(1.602+9\ k/16)$ GHz and $f2=(1.246+7\ k/16)$ GHz, where k is (0, 1, 2, 3, . . . 23) is the satellite number or satellite tag. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other satellite-based navigational system which is compatible with the present invention.

A SATPS uses transmission of coded radio signals, with the structure described above, from a plurality of Earth-orbiting satellites. A single receiver of such signals is capable of determining receiver absolute position in an Earth-centered or -fixed coordinate system.

Two or more receivers can be used to more accurately determine the relative positions between the receivers or stations. This method, known as differential positioning, is far more accurate than absolute positioning, provided that the distances between these stations are substantially less than the distances from these stations to the satellites. In differential position determination, many of the errors in the SATPS that compromise the accuracy of absolute position have little or no effect on differential positioning due to a process of partial error cancellation.

An SATPS antenna receives a SATPS signals from a plurality of SATPS satellites and passes these signals to an SATPS signal receiver/processor, which (1) identifies the SATPS satellite tag, or satellite source, for each SATPS signal, (2) determines the time at which each SATPS signal arrived at the antenna, and (3) determines the present location of the antenna based upon this information and from information stored on the ephemerides for each identified satellite.

In order to further improve the accuracy provided by SATPS location determination, differential GPS (DGPS), and more generally differential SATPS (DSATPS) has been introduced and used. A DSATPS can provide locations with inaccuracies as low as a few meters, or lower in some instances. Implementation of a DSATPS requires than an SATPS reference station, whose location coordinates are known with high accuracy (to within a fraction of a meter) be provided to receive the normal SATPS signals from SATPS satellites. The reference station compares its known psuedorange (psuedorange refers to the distance between a SATPS receiver antenna and a given SATPS transmitting satellite), based on its known location and known satellite and clock biases, with the psuedorange computed using the acceptable SATPS signals received from each visible satellite. The difference, called a psuedorange correction, between the known psuedorange and the computed psuedorange is transmitted for each such SATPS satellite, along with an indicium that identifies that satellite. A mobile SATPS station within 100–200 kilometers (km) of the reference station receives and uses these psuedorange corrections to correct its own SATPS-determined psuedorange values for each acceptable satellite signal. The psuedorange corrections must be received and processed at the mobile station.

While psuedorange correction techniques currently employed with DSATPS do provide for positional accuracy of the mobile SATPS receiver, they also require additional logic and circuitry, which in turn leads to increased cost. Additionally, a consumer is forced to pay for access to the DSATPS correction signals from the reference stations currently in use (such a service is available from Omnistar, of Houston, Tex.). There is a need for a low cost method of determining the position of a mobile SATPS receiver relative to a reference SATPS receiver when in close proximity to each other (within 1–20 kilometers).

Although SATPS-assisted determination of location and/or time coordinates is quite well known, only a few patents disclose procedures for using differential positioning techniques in order to improve the accuracy of relative location coordinates of a mobile receiver with respect to a given reference receiver. Rather, psuedorange corrections and such are generally used to improve the accuracy of the global positioning coordinates produced by SATPS. For example, in U.S. Pat. No. 5,495,257 Loomis discloses a method for enhancing the accuracy of global location coordinates computed for a mobile SATPS receiver by using psuedorange corrections generated by a reference SATPS station, whose location coordinates are known with a high degree of accuracy. Similar methods are disclosed by Babu in U.S. Pat. No. 5,451,964, and Kyrtsos in U.S. Pat. No. 5,490,073.

However, one method for determining the relative position of two SATPS receivers is disclosed in U.S. Pat. No. 5,202,829 by Geier. This system solves the problem of finding the relative positions of SATPS receivers by time-tagging candidate psuedoranges, aligning like-tagged psuedoranges from respective GPS receivers, and subtracting the difference between corresponding psuedorange to arrive at accurate relative position determinations. Although this method does provide for accurate relative position determination, there are drawbacks. Namely, complex logic and circuitry is required to use the psuedorange differences to arrive at a relative position. This results in additional cost and computational time. As a matter of fact, Geier's system utilizes a personal computer to perform this function.

Thus, is a need for a relative positioning method provided with simple, low-cost logic. Furthermore, it would be desirable to have a confinement system portable, that would take full advantage of the available area in a pet owner's yard; that was flexible in operation so as to accommodate desirable boundary changes in a confinement area, such as when new yard plantings occurred; that enabled the operator to designates "islands" of non-allowed areas within a larger allowable use area for the animal; and that consumed reduced amounts of power so as to provide long battery life.

SUMMARY OF THE INVENTION

It is an object of the present invention to provide new and improved apparatus that is not subject to the foregoing disadvantages.

It is another object of the present invention to provide a position locator system primarily for use in confining animals that enabled the operator to tailor the confinement boundary to the operator's pleasure.

It is still another object of the present invention to provide a position locator and confinement system that was portable but that was not limited to a substantially circular confinement area.

It is yet another object of the present invention to provide an animal confinement system that takes advantage of the accuracy provided by GPS to define the animal confinement area.

It is still yet another object of the present invention to provide a system that can be "taught" the desired location of a boundary of a confinement area and "retaught" as desired by the confinement system operator such that the confinement area can be changed at will.

It is another object of the present invention to provide a wireless system at an affordable cost that utilizes GPS to locate a mobile transmitter or receiver unit within a predetermined area and to utilize the mobile unit to apply a stimulus adapted to encouraging the unit wearer to remain within the predetermined area.

The foregoing objects of the present invention are provided by method and apparatus for determining the position of a portable transmitter or receiver and applying a stimulus to the carrier thereof when the carrier is determined to be within a predetermined stimulus application area. An apparatus in accord with an embodiment of the present invention will include a mobile unit including a receiver that is preferably receptive to signals broadcast by Global Positioning System Satellites (GPSS). The mobile unit will include a microprocessor and a memory capable of storing the boundary coordinates of the predetermined boundary. The microprocessor will be further capable of determining continuously or at predetermined intervals its location relative to the predetermined boundary. The mobile unit may include a stimulus producing apparatus such as a speaker or electrode to provide audible warnings or electrical shocks as appropriate. The mobile unit may also include a transmitter for transmitting its position to a receiver within a reference unit.

A method for confining an animal in accord with the present invention will include the steps of determining a boundary, teaching the boundary to the system by inputting the boundary coordinates into an appropriate memory of a mobile unit, providing a processor for processing received signals indicative of position, whether such signals are actual coordinates, GPS signals, or some other such position indicating reference signals, processing the signals to determine the position of the mobile unit, comparing the position of the mobile unit relative to a predetermined boundary, and providing an output indicative of the relative position of the mobile unit to the predetermined boundary. Such an output could be an audible tone, an electric shock, or a human voice.

As a further step in a method according to the present invention, the method could include the step of designating certain areas within the previously determined external boundary as being unavailable or off limits to the wearer of a mobile unit. For example, certain yard areas or "islands" within the larger yard could be designated as off limits and warning stimuli provided to the wearer of the mobile unit when the wearer approached the island. Thus, a pet could be taught to stay away from certain yard areas, such as a garden, for example.

The present invention finds wide application in many areas. For example, a parent could attach a mobile unit of a system in accord with the present invention to a child and monitor the child's location within a predetermined boundary. The system would be useful where the parent would be vacationing away from home or visiting away from home or where a yard wasn't fenced. A system useful with such an application could include the parent's voice pre-recorded and held in a memory within the mobile unit. The mobile unit would then provide the parent's voice as an auditory output through a speaker included within the mobile unit when the child was within predetermined distances of the predetermined boundary. The unit could provide one or more levels of warnings as the child approached or left the predetermined boundary, such as a yard or playground. Rather than using an electrical shock as an ultimate stimulus, the mobile unit could include an odor producing apparatus that would emit a strong, unpleasant odor as the child approached a prohibited area.

Another application for the present invention would be with automated devices, such as a solar powered lawn mower. The mobile unit would be attached to the mower and the lawn's boundary would be programmed into the reference unit. The mower could then mow the lawn accurately insuring accurate coverage of the entire lawn since it could determine that it had mowed all of the area because it would know its position at all times.

Yet a third application for the present invention would be to provide sight-disadvantaged person with a reference system for determining their position continuously and accurately. Such persons would carry the mobile unit with them as they moved around a city. The system could be enhanced by the inclusion of a speaker in the mobile unit that was capable of replicating the sound of a human voice. The mobile unit could thus audibly inform the users of their locations based upon the unit's position, providing them with information concerning familiar landmarks such as buildings and building entrances, approaching intersections, or the like.

In such an embodiment a city may provide a centrally located reference unit and those sight disadvantaged persons could obtain mobile units with the desired landmarks pre-programmed, permanently or otherwise, into the unit.

Finally, another such application is the use of the present system in a pet confinement system. In such a system the mobile unit can include both auditory and shock stimulus producing and providing apparatus. Such a system would enable the pet owner to designate substantially the entire yard for the pet's use, while reserving specific areas, such as new plantings.

It will be understood that rather than using either auditory or electrical shocks as a stimuli, other forms of stimuli could also be used, such as vibration as is found in many pager devices currently marketed or some form of light stimuli, such as a brightly flashing light.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIGS. 10 is a schematic illustration of the functioning of the GPS system.

DETAILED DESCRIPTION OF THE INVENTION

Figure 1:
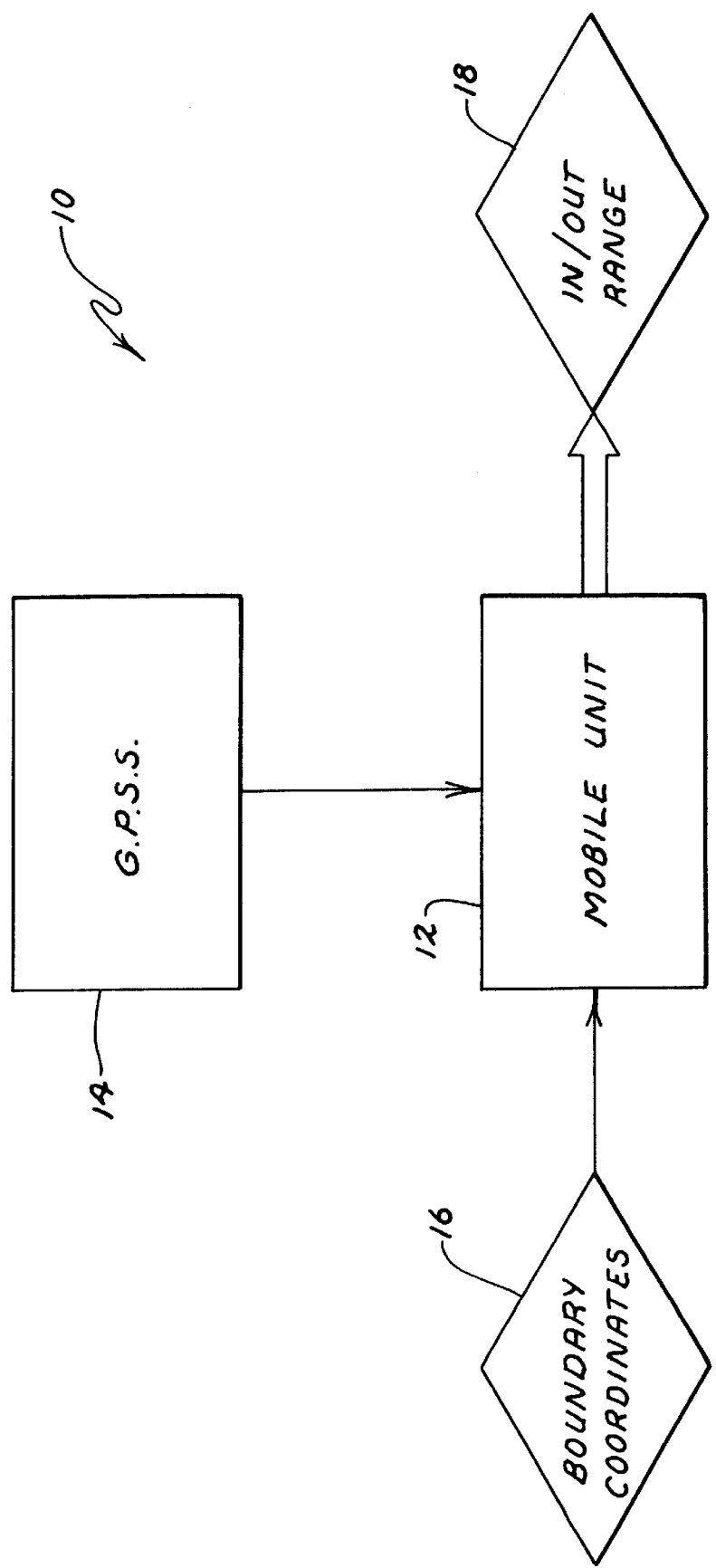
FIG. 1 is a schematic illustration of one embodiment of a system according to the present invention.

FIGS. 1–5 represent alternative embodiments of a system in accord with the present invention. According to the system 10 of FIG. 1, a mobile unit 12, such as might be attached to a dog collar, receives a position indicating data signal from GPSS 14. The mobile unit 12 has been preprogrammed to include the boundary coordinates 16 of the confinement area. The mobile unit includes a microprocessor that compares the position derived from the GPS signal 14 with the boundary coordinates 16. The logic programmed into the mobile unit 12 will determine the location of the mobile unit relative to the coordinate boundaries 16 and will then determine if the animal is within or without of the predefined range of movement 18. The mobile unit can then apply the appropriate stimulus to the animal if the determined position indicates that a stimulus is warranted according to the predetermined stimuli application criteria.

FIG. 1 is a preferred embodiment of the present invention, but due to inherent inaccuracies preprogrammed into the GPS signals presently broadcast by GPS satellites a single receiver such as mobile unit 12 cannot be used to determine position with sufficient accuracy that GPS can be used as a reference signal to determine position within a typically sized lawn. That is, with GPS signals broadcast today a position can be determined only to an accuracy of ±30 meters (100 feet). This inherent inaccuracy is too large to use as a reference signal in a typical lawn, which may measure less than 150 feet (45 meters) on a side (approximately ½ acre).

Figure 2:
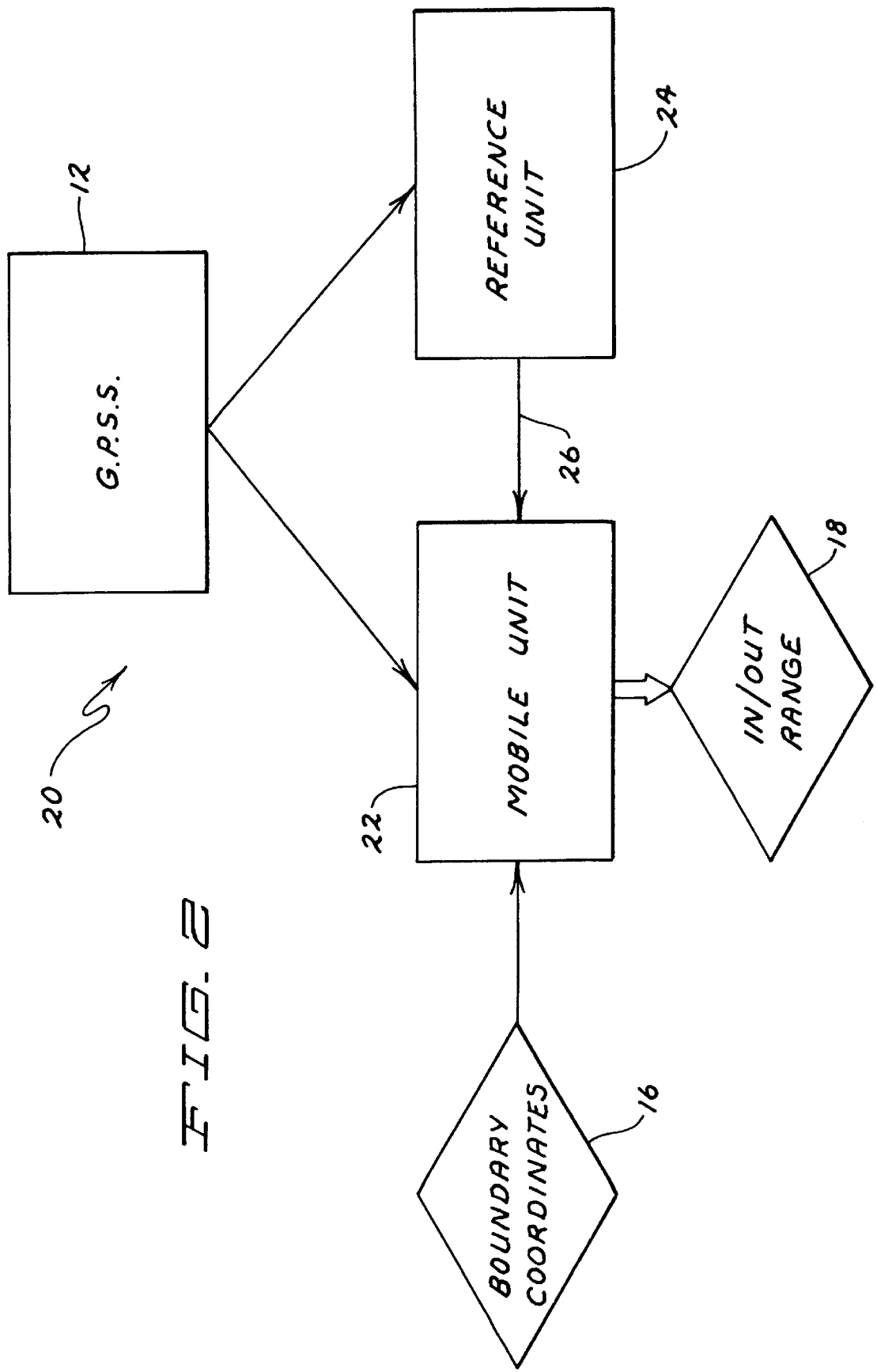
FIG. 2 is a schematic illustration of another embodiment of a system according to the present invention.

FIG. 2 shows another embodiment 20 of a system in accord with the present invention. System 20 includes a mobile unit 22 and a stationary or reference unit 24, both of which include a receiver (not shown) to receive signals from GPSS 14. Mobile unit 22 is preprogrammed to include the boundary coordinates 16. The reference unit 24 includes a transmitter (not shown) that broadcasts a reference signal 26 containing reference data to the mobile unit 22. The mobile unit 22, using the GPS signals and the reference data, determines whether it is within or without the stimulus application range 18. The system 20 of FIG. 2 can be used to determine position even considering the present inherent, intentional inaccuracies in GPS signals as will be explained further below.

Figure 3:
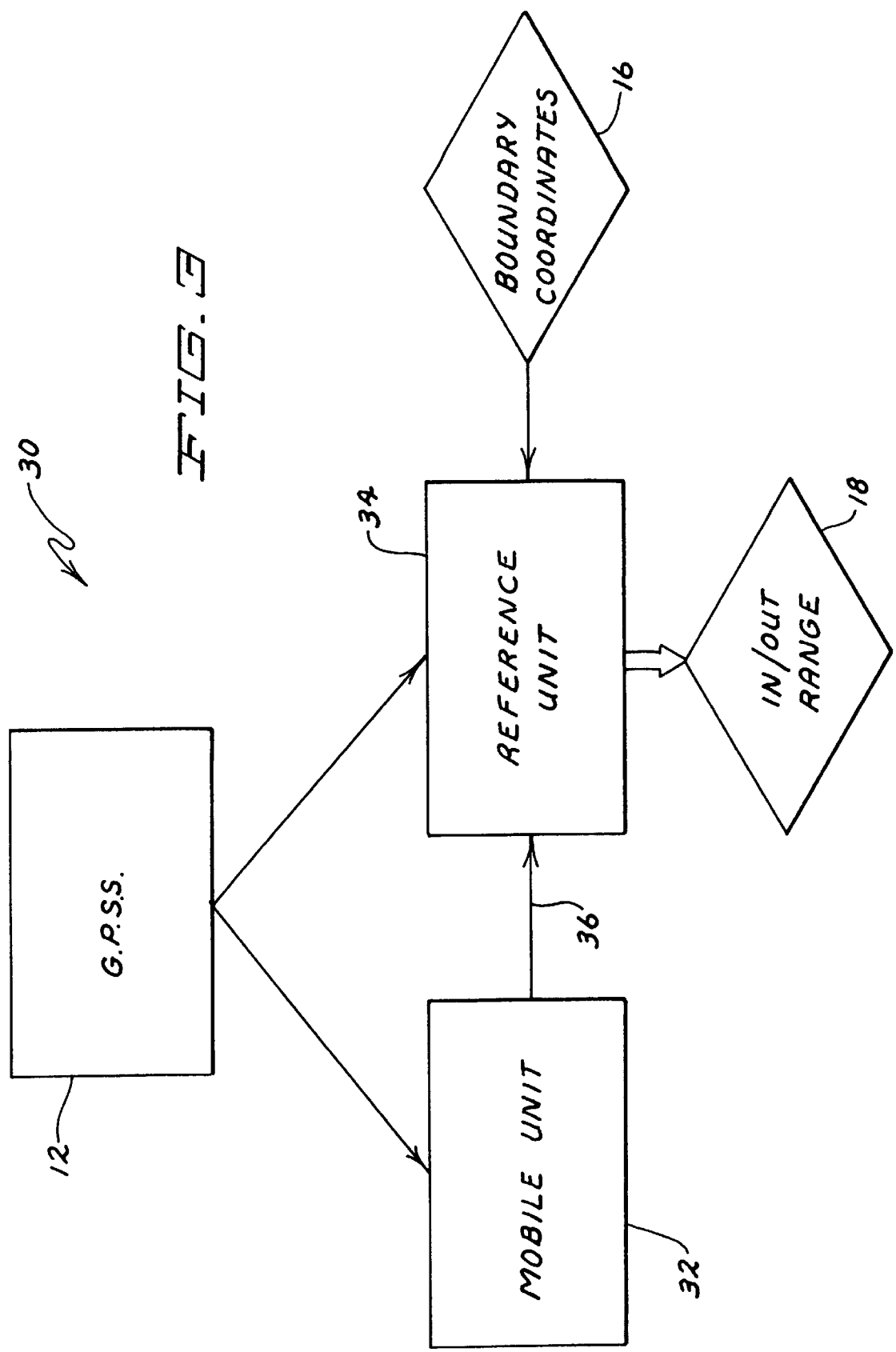
FIG. 3 is a schematic illustration of another embodiment of a system according to the present invention.

FIG. 3 shows yet another embodiment 30 of the present invention wherein the embodiment 30 includes a mobile unit 32 and a reference unit 34, both of which include a receiver (not shown) to receive GPS signals 12. In this embodiment, the boundary coordinates 16 are programmed into the reference unit. Mobile unit 32 broadcasts a mobile signal 36 including information relating to the position of the mobile unit to the reference unit 34. The reference unit 34 in turn continuously determines the position of the mobile unit based upon the GPS signal 12 and the mobile data signal 36. This position is compared to the boundary coordinates 16 to determine if the mobile unit is within or without the stimulus application range 18. If it is determined that the mobile unit is within the stimulus application range 18, the reference unit 34 will transmit a signal to the mobile unit 32 directing the application of a stimulus to the animal. This system requires the presence of both receivers and transmitters in both the mobile and reference units 32 and 34, unlike the system 20, which requires only that the reference unit include a transmitter. This system may have desirable application where a stimulus was perhaps not desired, such as where the mobile unit is worn by a small child and the child's position is relayed to the reference unit monitored by a parent. In such a system, a stimulus producing device would not be used, or would be limited to an auditory or vibratory apparatus such as is presently found on pagers.

Figure 4:
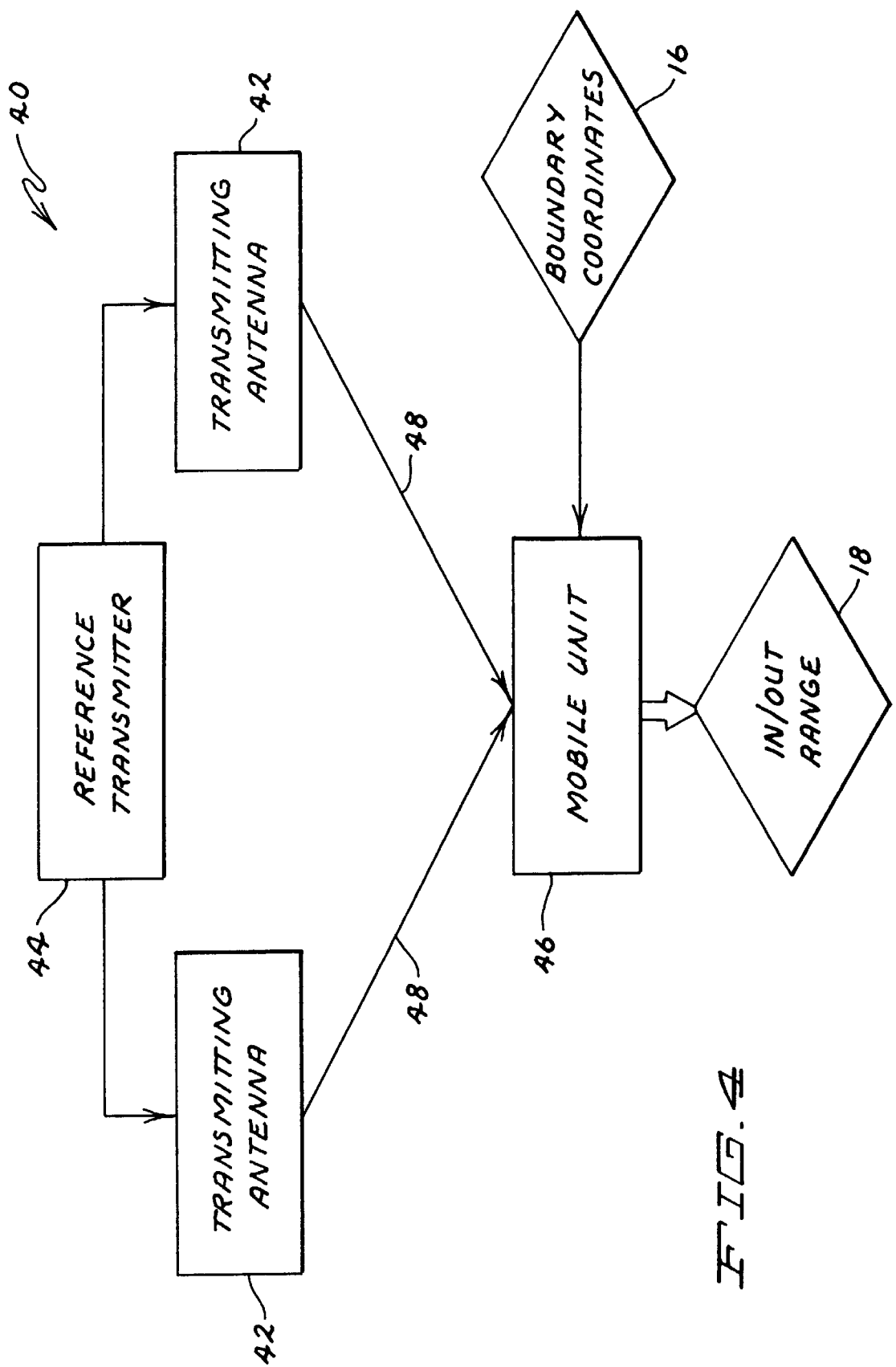
FIG. 4 is a schematic illustration of another embodiment of a system according to the present invention.
Figure 5:
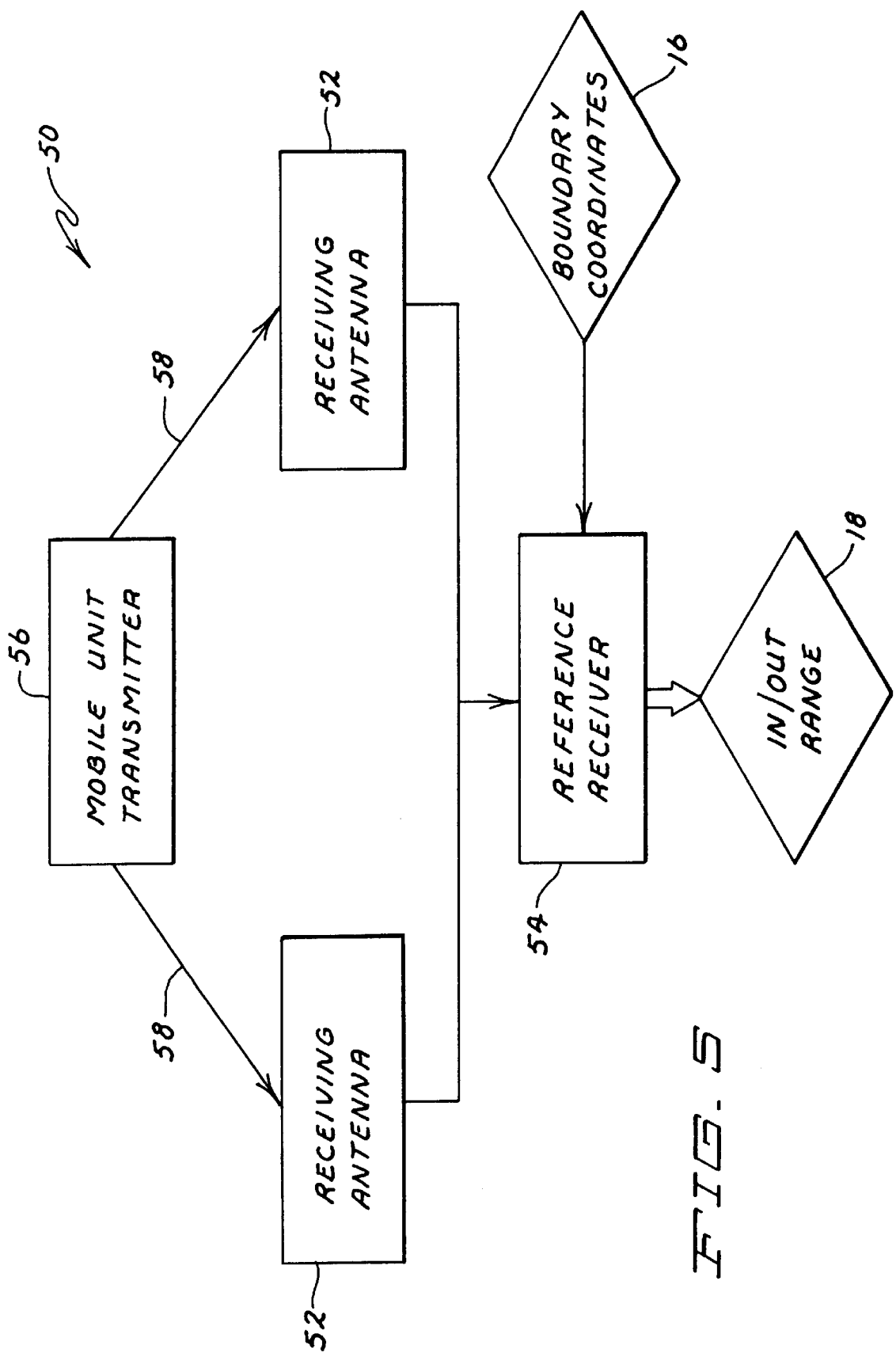
FIG. 5 is a schematic illustration of another embodiment of a system according to the present invention.

Referring now to FIGS. 4 and 5, other systems in accord with the present invention will be described. In FIG. 4, an animal containment system 40 includes a pair of antennas 42, a transmitter 44, and a mobile unit 46. The transmitter 46 provides a signal to the antennas 42, each of which broadcasts a signal 48, electromagnetic or ultrasound, capable of being received by the mobile unit 46. The mobile unit 46 calculates its position by triangulation using the signals received from the antennas 42, compares them with the boundary coordinates 16 to determine its position relative thereto, and then applies the appropriate stimulus as predetermined by the operator.

FIG. 5 illustrates a system 50 that includes antennas 52, a receiver 54, and a mobile unit 56. The mobile unit 56 broadcasts triangulation signals 58 to the antennas 52, which in turn provides them to receiver 54. The receiver 54 will use the signals received by the antennas 52 to calculate the position of the mobile unit 56. The position of the mobile unit 56 can be compared against the boundary coordinates 16 to determine whether the mobile unit is within or without the range 18. This system could find use, for example, where, the application of a stimulus was not desired, but the location of the mobile unit was, such as when the mobile unit would be worn by a small child playing outside. FIGS. 4 and 5 represent embodiments that can be employed for situations where GPS signals are not available, such as within a dwelling.

As explained previously, one of the deficiencies in prior art animal confinement systems is that they either were not portable, or if they were portable, they were unable to function with anything other than a substantially circular confinement perimeter. The present invention overcomes that prior art deficiency by including apparatus and method for "teaching" the preferred boundaries to the system, the coordinates of the preferred boundary being stored in memory in either the reference unit or the mobile unit. The vertices of the boundary are taught to the particular unit where the coordinates are stored by walking the boundary and entering the coordinates thereof into the unit and storing them therein, the coordinates being determined with reference to the globally broadcast GPS signals. With the present invention, it is also possible to define internal boundaries or "islands" from which it is desired to keep the animal away. Such an area may be new yard plantings, for example.

Figure 6:
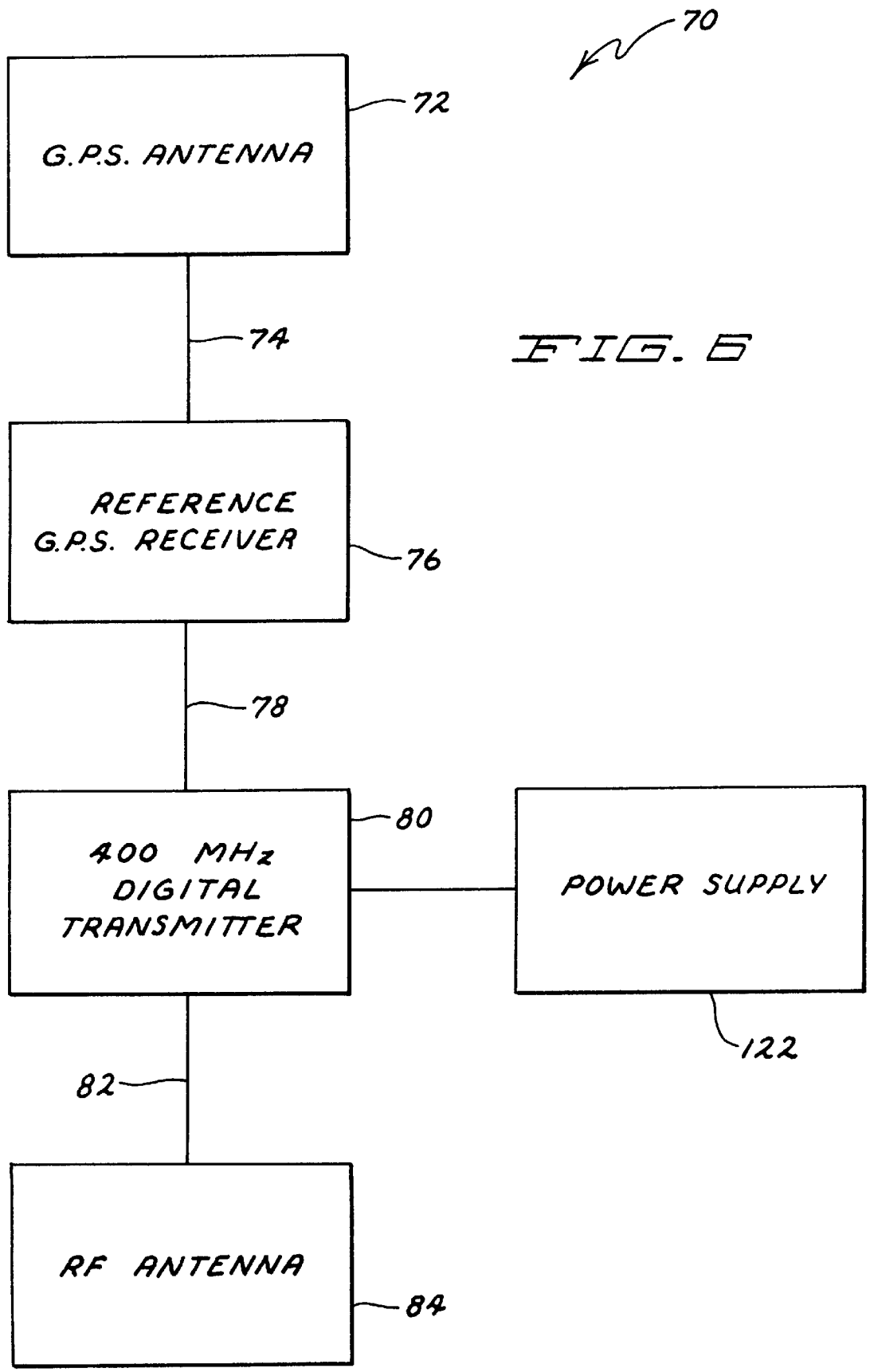
FIG. 6 is a block diagram of a reference unit capable of being used in accordance with the present invention.
Figure 7:
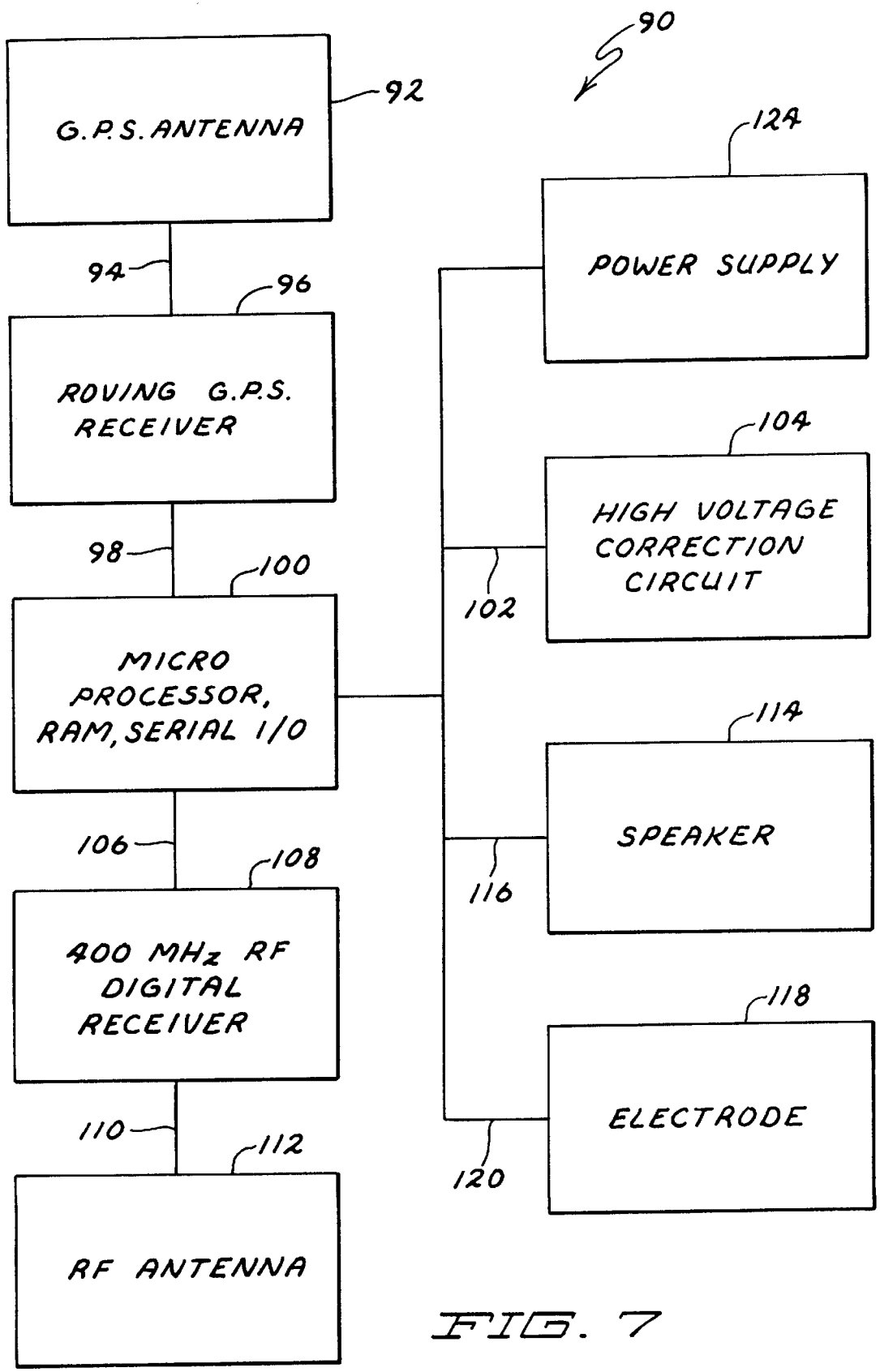
FIG. 7 is a block diagram of a mobile unit capable of being used in accordance with the present invention.

With reference to FIGS. 6 and 7, then, a schematic of the reference unit and a mobile unit useful in association therewith is seen. FIG. 6 shows the components of a reference unit 70. Unit 70 will include a GPS antenna 72 capable of receiving signals broadcast by GPSS. Antenna 72 transmits the received GPS signals via an appropriate connector 74, which may be coaxial cable, to a reference GPS receiver 76, which may be of the type designated as "Oncore"™ and manufactured by Motorola. Receiver 76 is connected by an appropriate connector 78, which may be a bus, to a transmitter 80, which is capable of providing digital radio frequency signals in one embodiment of the present invention, though in other embodiments the transmitter 80 may be capable of broadcasting ultrasonic signals. The radio frequency signals are provided by an appropriate connector 82, which may advantageously be coaxial cable, to an antenna 84 for broadcasting.

A mobile unit useful with the reference unit shown in FIG. 6 is shown in FIG. 7. Thus, FIG. 7 illustrates a mobile unit 90 that also includes a GPS antenna 92 connected by an appropriate connector 94 to a GPS receiver 96, which like GPS receiver 76 may be of the type designated as "Oncore"™ and manufactured by Motorola. Receiver 96 is connected by an appropriate connector 98, which may be a NEMA bus, to a device 100 including a microprocessor, random access memory (RAM), and an input/output apparatus. Device 100 will be explained in greater detail below. Device 100 is connected by an appropriate connector 102 to a high voltage correction circuit 104 and by an appropriate connector 106, which may be a serial bus of known type and construction, to a receiver 108, which in turn is connected by an appropriate connector 110, which may again be coaxial cable, to a radio frequency antenna 112. Antenna 112 receives radio frequency signals, such as those transmitted by antenna 84 of reference unit 70, and provides them via connector 110, receiver 108 and connector 106 to device 100.

Device 100, as noted, would include a microprocessor, random access memory, and an input/output apparatus, which may be as simple as some touch buttons on the exterior of the mobile unit 90. In this particular embodiment of the present invention, reference unit 70 and mobile unit 90 will function substantially as follows. Each unit will receive GPS signals via their respective antenna 72, 92, from the GPSS network. These signals, as noted earlier, provide an indication of the position of the particular unit. A signal, indicating the calculated position coordinates of the reference unit is transmitted from the reference unit 70 to the mobile unit 90. The mobile unit 90 will receive the transmitted reference unit signals via its antenna 112 and will convey those received reference unit signals to device 100 via receiver 108 and connector 106. Device 100 will then calculate the position of the mobile unit with respect to the position of the reference unit and compare it with the preestablished boundary stored in RAM. If it is determined that a stimulus is warranted, the microprocessor of device 100 will direct the application of a stimulus. As noted, this could be an auditory signal, such as a beep of some predetermined volume and tone emitted by speaker 114, which is connected to device 100 by an appropriate connector 116. Or it could be an electrical shock administered through the electrode 118 via a connection to the device 100 through an appropriate electrical connector 120. Both units 70 and 90 will be powered by the appropriately sized electrical power source 122, 124 respectively. Power source 122 will appropriately be standard alternating current (ac) available through the local power grid or an appropriately sized rechargeable battery. Power source 124 will preferably be an electrically rechargeable battery.

Figure 8:
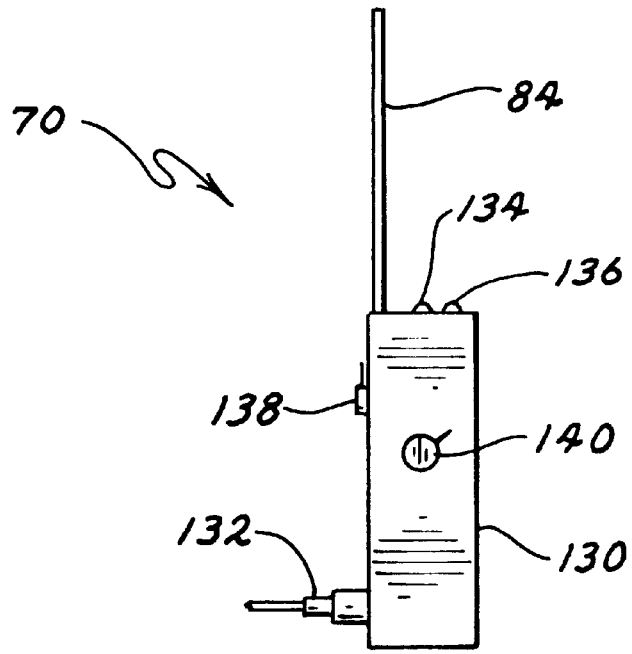
FIG. 8 is an external side view of a reference unit in accord with the present invention.

An external view of a reference unit 70 in accord with the present invention is shown in FIG. 8. Unit 70 includes a casing or housing 130 having antenna 84 extendible therefrom and ac/battery recharger plug-in 132. Casing 130 can also contain several light emitting diode (LED) indicators thereon, such as a battery status LED 134 to provide an indication of a need to replace or recharge a battery used therewith. Casing 130 can in addition include a mode status LED 136 to provide an indication of the mode of operation selected by the user using a mode select switch 138. With switch 138 the operator can select between the following modes of operation: off, manual, or automatic. A manual stimulus switch 140 is also provided to so that the operator can manually apply a stimulus to an animal during a training phase in teaching the animal the operation of the system and the location of the boundary beyond which the animal is not to pass.

Figure 9:
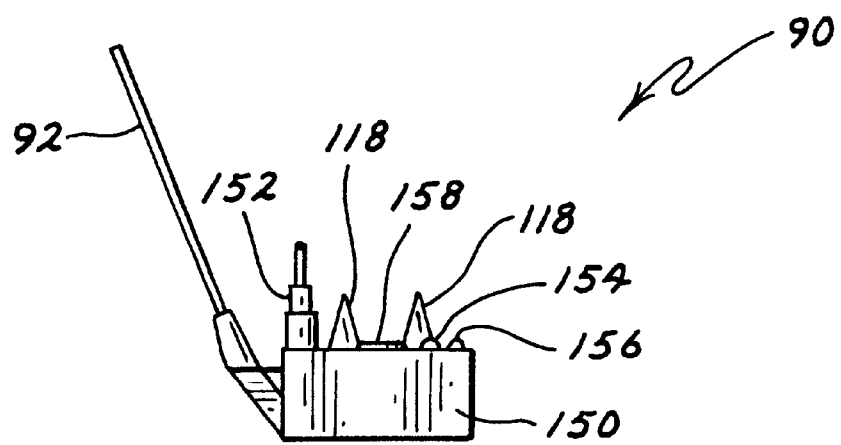
FIG. 9 is an external side view of a mobile unit in accord with the present invention.
Figure 11A:
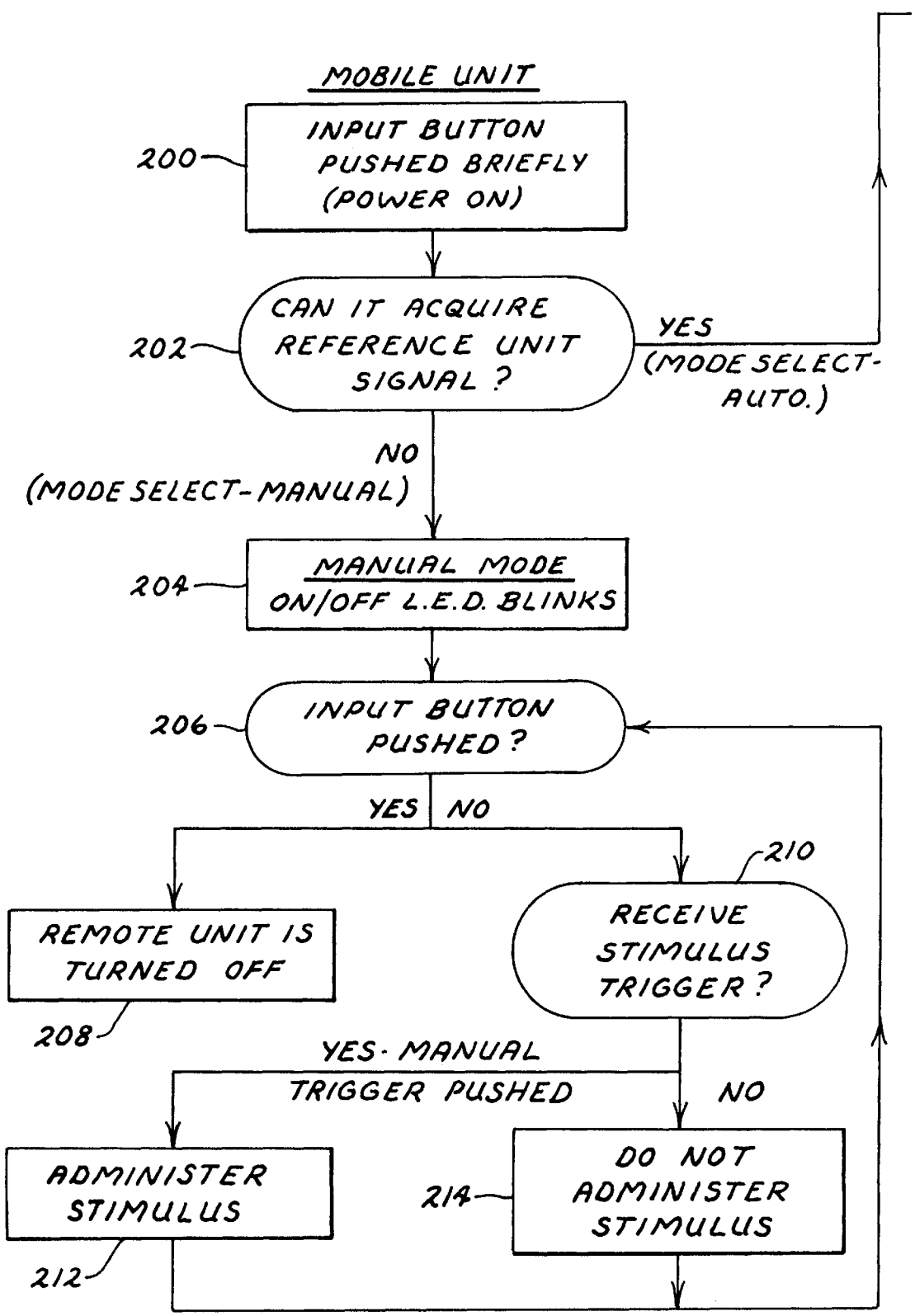
FIGS. 11A–11F is a block diagram of a flow chart for programming of a programmable microprocessor useful in a mobile unit in accord with the present invention.
Figure 11B:
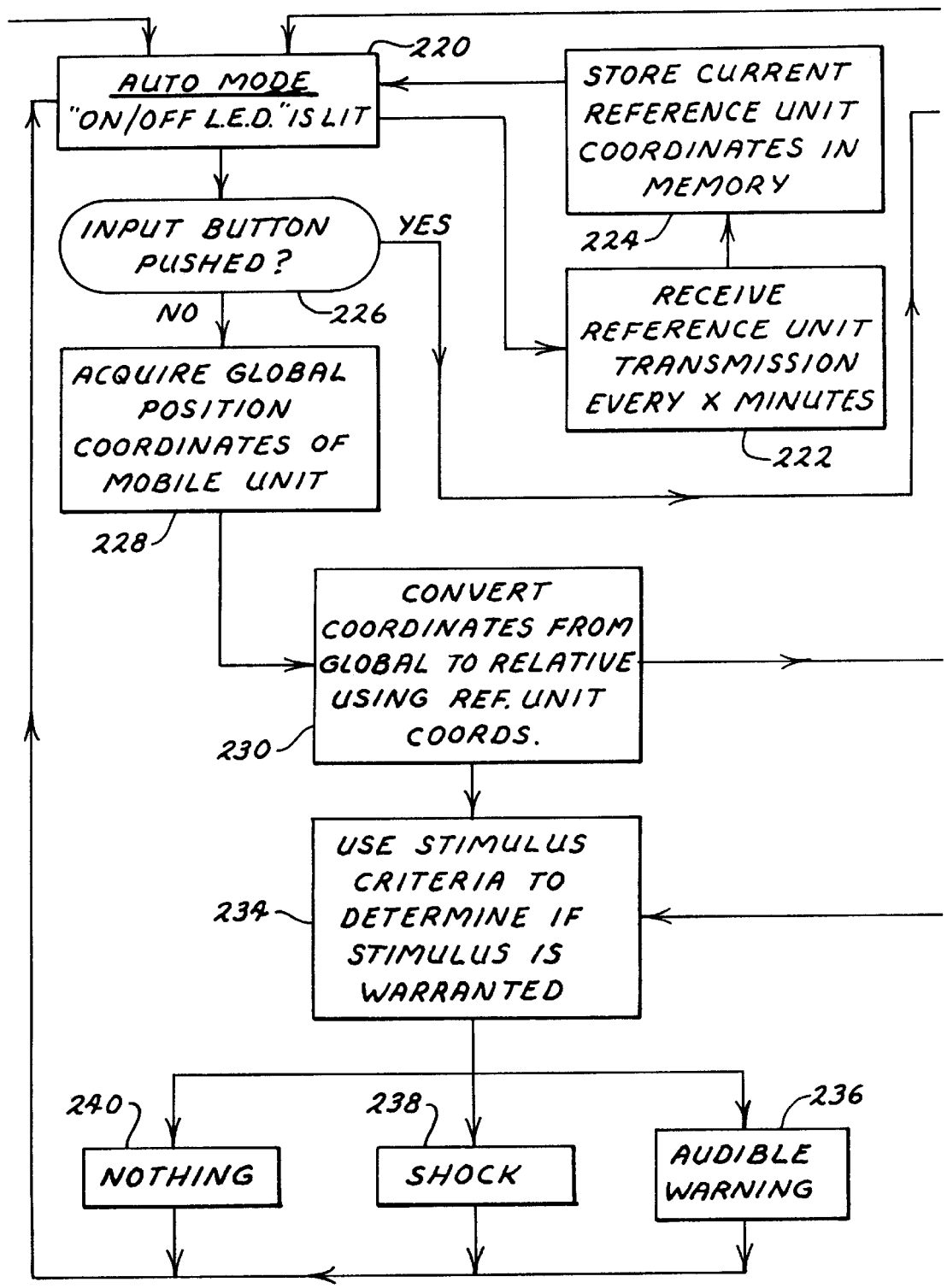
Figure 11C:
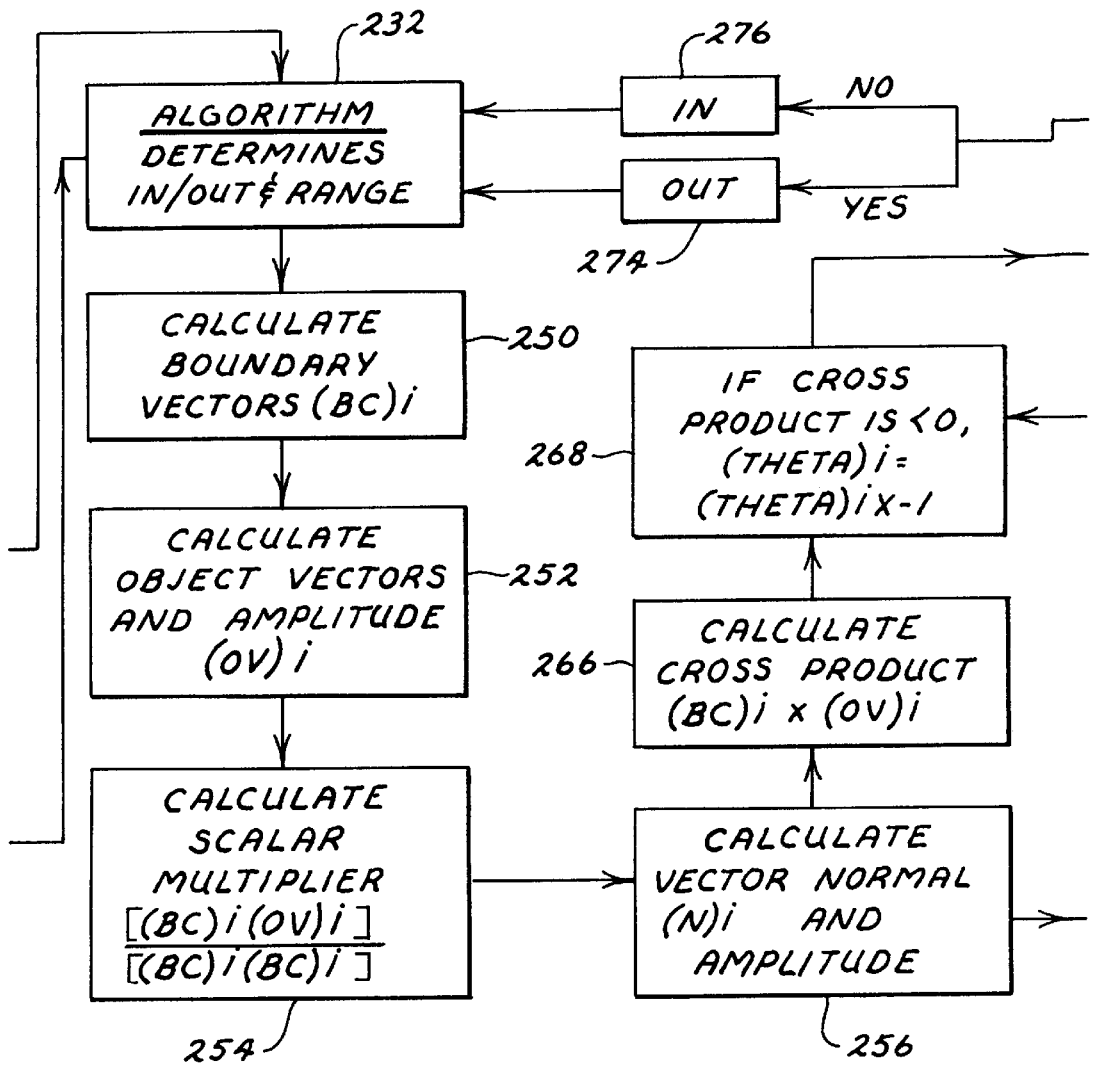
Figure 11D:
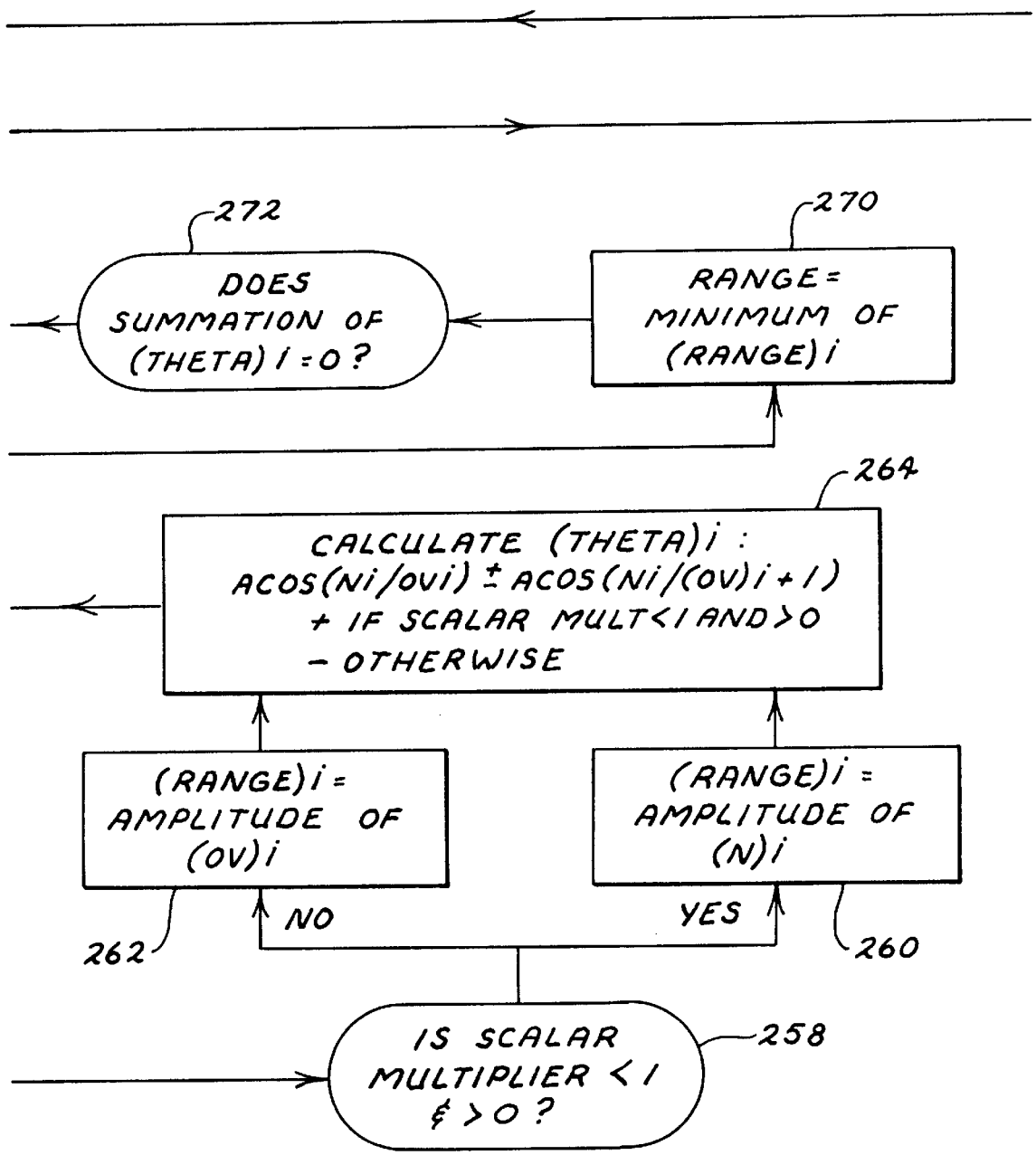
Figure 11E:
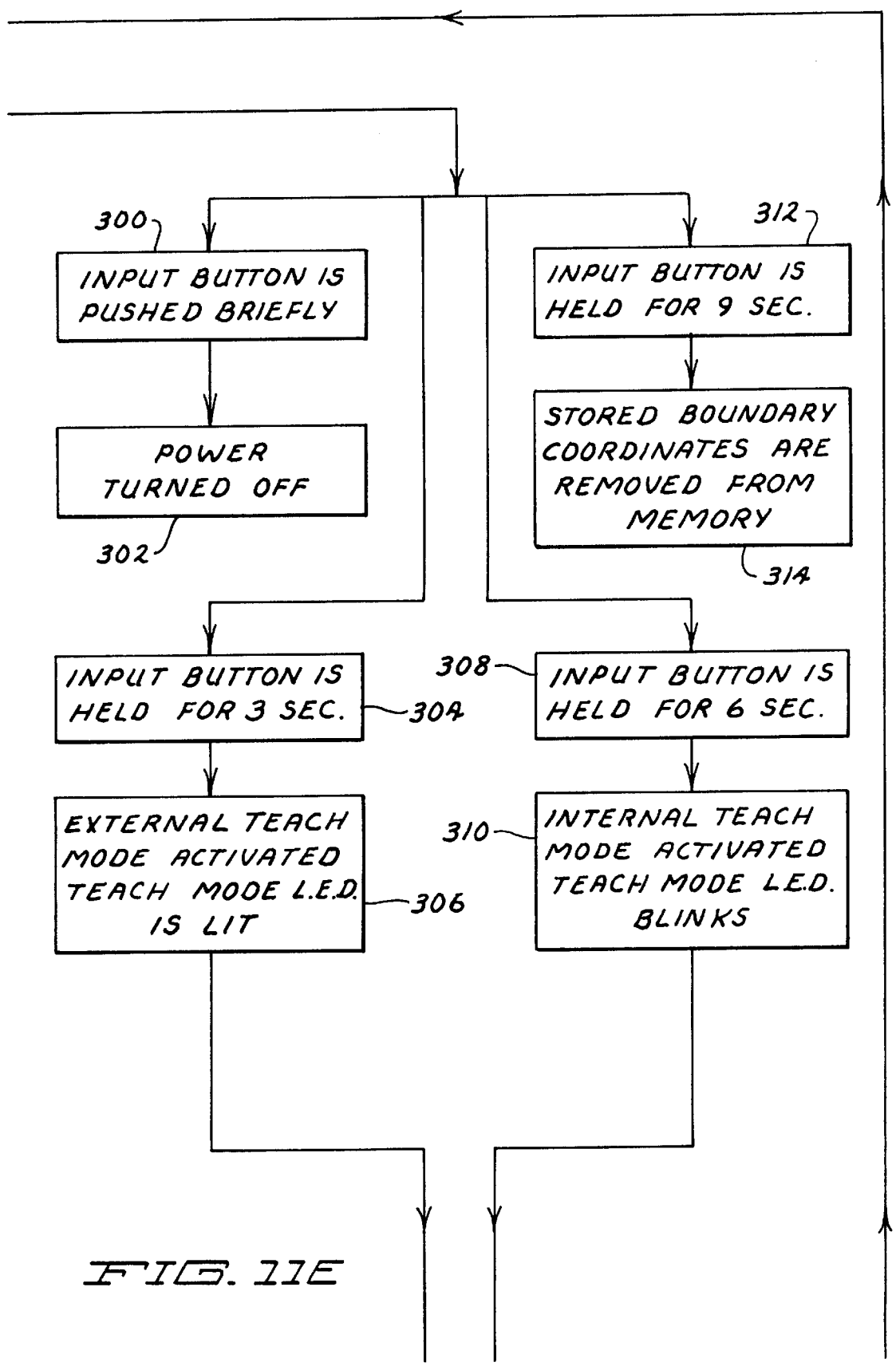
Figure 11F:
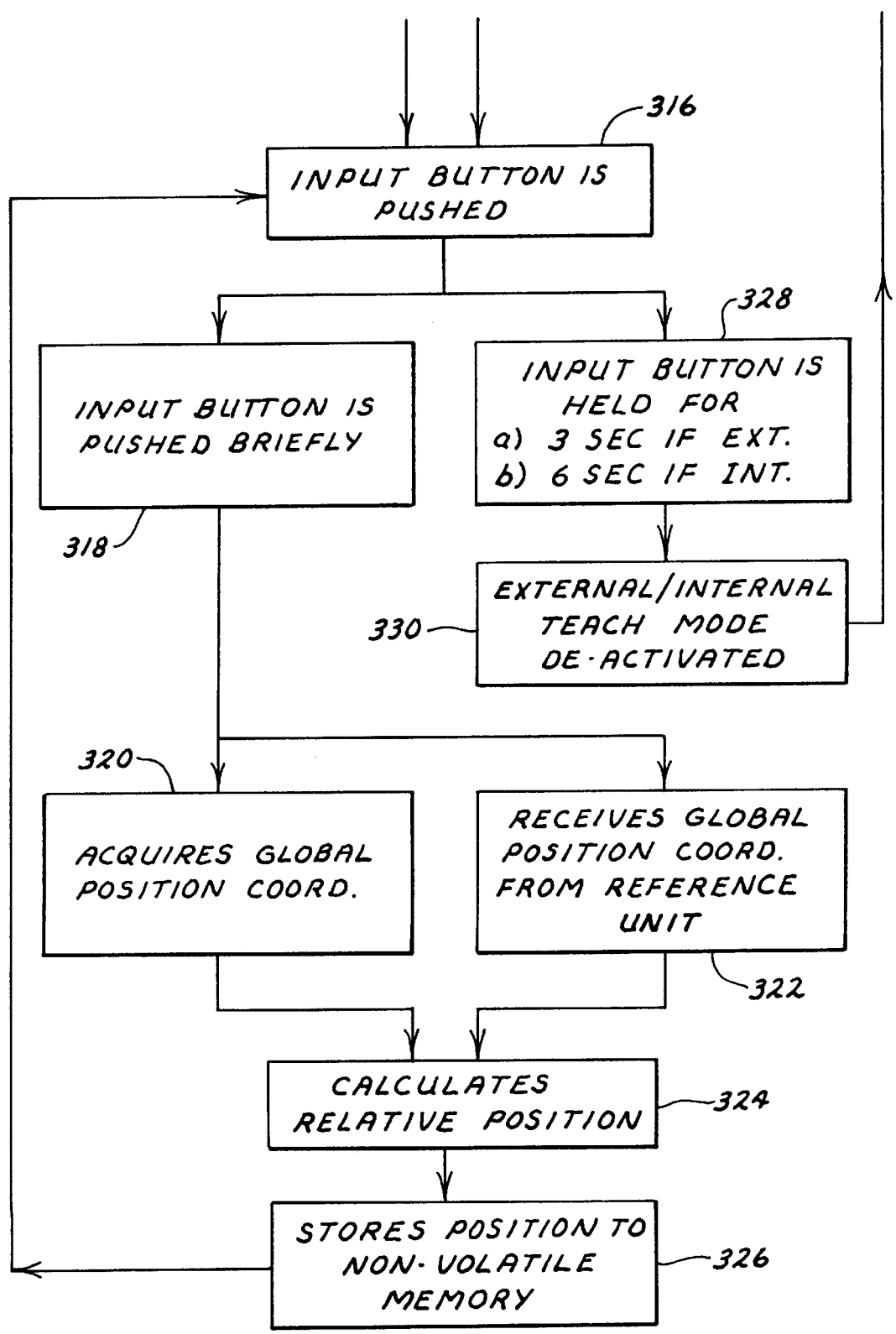

FIG. 9 illustrates in a side elevation view a mobile unit, such as unit 90, in accord with the present invention. Reference unit 90 includes a casing 150 from which antenna 92 extends. Casing 90 can have an ac/battery recharger plug-in 152 for providing recharging of a battery used to power the unit 90. Mobile unit 90 advantageously includes at least a pair of LEDs for indicating the operation of the mobile unit 90, including, for example, an on/off LED 154 and a teach mode LED 156. A pair of electrodes 118 extend outwardly from the casing 150 to provide an electrical stimulation to the animal as warranted while a speaker such as speaker 114 is contained internally within casing 150. An input button 158 is provided to provide inputs to device 100.

Input button 158 and device 100 cooperatively function to provide a variety of functions useful with the present invention, such functions including on/off, external teach mode, and internal teach mode. For example, button 158 can function as an on/off switch where a brief push turns the unit 90 on or off. When held in for a longer period of time, such as three seconds, the mode of "teaching" the unit 90 and thus the system of the present invention the external boundaries can be initiated with subsequent brief pushes on the button 158 storing external boundary coordinates in RAM of device 100. The teaching mode for the external boundary coordinates can be ended by pushing the input button 158 for, say, another three seconds.

Similarly, "internal" boundary coordinates can be input into the mobile unit 90. It will be recalled that while a pet may generally be allowed to roam freely the "ocean" of a yard, there may be "islands" within that ocean where it is desired to keep the pet from going. Such islands may comprise a garden or new plantings, for example. Thus, the present invention provides apparatus and method for preventing encroachment upon such islands by the animal. The input button 158 can be held for a predetermined period of time, say six seconds to initiate the teach mode for the internal boundary coordinates. As with the external boundary coordinates, the vertices of the boundary of any internal islands can be stored in the random access memory of the device 100 with subsequent brief pushes on the button 158. This mode can be repeated as often as desired to store the boundaries of additional islands.

In operation, both units 70 and 90 will be switched on. The first time the mobile unit is switched on, the "external" boundary coordinates will be placed in the RAM of device 100 of unit 90. This inputting of the boundary coordinates is accomplished by carrying the unit to a boundary vertex and pushing on the input button 158 to store the boundary vertex coordinate in RAM. The unit is then carried to an adjacent vertex and the input button 158 is again pushed to store the coordinate in RAM. It will be understood that the unit is carried similarly around the entire boundary with the external boundary vertices being input into the RAM of unit 90. The external boundary perimeter is then determined by device 100 by creating straight lines between consecutively input coordinates and the first and last coordinates input therein.

Similarly, the boundary perimeter of any internal islands will be formulated by creating straight lines between the consecutively input coordinates and then forming a line between the first and last input coordinates by device.

The position of the mobile unit, and hence the boundary, internal or external, and any person or animal associated therewith, can be determined according to the illustration shown in FIG. 10. As seen there, both the reference unit 70 and the mobile unit 90 receive GPS signals 160 broadcast from a plurality of GPS satellites 170, 172, 174. The position of each unit receiving the signals, such as ground based units 176 and 178, which could be reference unit 70 and mobile unit 90, respectively, can be determined according to commercially available devices, such as the aforementioned Motorola Oncore™ device. As noted previously, however, the position information available from these satellites is intentionally not sufficiently accurate for use in a pet confinement system or for the other applications previously mentioned herein. Such accuracy is presently limited to approximately 30 meters (100 feet). The inherent inaccuracy provided by a single unit receiving such signals, however, can be eliminated by the use of two relatively close receivers that receive signals from the same satellites and under the same atmospheric conditions. That is, the inaccuracy of the position of the reference and mobile unit as determined by their own calculations will be substantially the same in terms of distance and direction. Thus, by subtracting the relative positions of the two units with respect to each other, the inaccuracy of a single receiver can be eliminated. This is otherwise known as differential position determination.

Thus, as illustrated in this Figure, the unit 176 will broadcast its position $X_1=(x_1, y_1, z_1)$ as determined by the received signals 160 to the unit 178, whose position has been determined to be $X_2=(x_2, y_2, z_2)$. The relative position of the unit 178 will then be the difference between the global positions of the units 176–178. This relative position, which will be free of the inherent inaccuracy provided by the present GPSS signals, can be expressed as $$[X]_{relative}=[X]_1-[X]_2, \quad (1)$$

where the brackets indicate a vector. Because of the need to substantially reduce, and preferably to eliminate, the error inherent in GPS signals, the embodiment shown in FIG. 2 is preferred for use in such an application as a pet confinement system.

Stated otherwise, and still in reference to FIG. 10, an SATPS mobile station carries an SATPS signal antenna and associated SATPS signal receiver/processor and a mobile station receiver and associated processor in one embodiment of the invention. An SATPS reference station includes an SATPS signal antenna and associated SATPS signal receiver/processor and a reference station transmitter and associated processor. The reference station receives SATPS signals from M SATPS satellites (M is greater than or equal to 3). Receipt of these signals allows the reference station to compute the present location $(x,y,z)_{ref}$ of the reference station's SATPS antenna in a selected coordinate system. The spatial location coordinates $(x,y,z)$ may be expressed in any coordinate system and are not limited to the Cartesian Coordinate System. The reference station transmitter and antenna transmit the location coordinates and satellite tags ("satellite tags" refer to identification of which SATPS satellite signals were used to compute the spatial location coordinates of the reference station) to a SATPS mobile station that is spaced apart from the reference station. The true location of the reference station need not be known to any degree of accuracy.

The mobile station receiver/processor receives the transmission from the reference station which includes coordinate information and the associated satellite tags. The mobile station SATPS antenna and receiver/processor receive SATPS signals from the same M satellites as used by the SATPS reference station, and compute the spatial location coordinates of the SATPS mobile station. These coordinates are expressed using the same coordinate system as was used by the reference station. The mobile station processor computes the location of the mobile station SATPS antenna relative to the reference station SATPS antenna by subtracting the location coordinates of the reference station from the mobile station location coordinates using equation (1) above.

Similarly, in a second embodiment of the invention, an SATPS mobile station caries an SATPS signal antenna and association SATPS signal receipt/processor and a mobile station transmitter and associated processor. An SATPS reference station includes an SATPS signal antenna and associated processor. The mobile station receives SATPS signals from M SATPS satellites (M is greater than or equal to 3). Receipt of these signals allows the mobile station to compute the present location $[X_{ref}]=(x,y,z)_{ref}$ of the mobile station's SATPS antenna in a selected coordinate system.

The mobile station transmitter and antenna transmit the location coordinates and satellite tags to a SATPS reference station that is spaced apart from the mobile station. The true location of the reference station need not be known to any degree of accuracy.

The reference station receiver/processor receives the transmission from the mobile station which includes coordinate information and the associated satellite tags. The reference station SATPS antenna and receiver/processor receive SATPS signals from the same M satellites as used by the SATPS mobile station, and compute the spatial location coordinates of the SATPS reference station. These coordinates are expressed using the same coordinate system as was used by the mobile station. The reference station processor computes the location of the mobile station SATPS antenna relative to the reference station SATPS antenna by subtracting the location coordinates of the reference station from the mobile station location reference coordinates (equation (1)).

The microprocessor of device 100 may be programmed to operate in accordance with the foregoing description of operation. A flowchart for such programming is shown in FIGS. 11A–11F. Thus, to begin operation, the input button 158 is pushed in to turn the mobile unit 90 on as indicated at 200. Reference unit 90 will then determine whether it is acquiring a transmitted signal from the reference unit 70 as indicated at 202. If a signal is not acquired from the reference unit 70, then as will be noted below in reference to FIG. 12, the reference unit will be in the manual mode and the manual mode indicator on the reference unit will indicate that the unit 70 is in manual mode, such as when the LED 136 blinks, as indicated at 204. The mobile unit, that is the microprocessor of device 100, will then check to see if the input button 158 is activated, such as by depressing it, as indicated at 206. If the button 158 has been depressed as at 206, the mobile unit 90 will have been turned off as at 208.

If the mobile unit is on and functioning, the mobile unit will check to see if it is receiving a signal from the reference unit indicating that a stimulus is to be applied as indicated at 210. If a signal to administer a manual stimulus is received, indicating that manual stimulus trigger 140 has been activated, then a stimulus will be administered, as indicated at 212. If no such signal indicating a stimulus is to be applied, no stimulus will be applied, as indicated at 214. The unit will then cycle and once again check to see if the input button has been pushed to turn the unit on.

If the mobile unit does acquire a signal from the reference unit and the unit is in the automatic mode, then the LED indicating the unit is on will be lit steadily as indicated at 220. The mobile unit will be receiving a transmission indicative of the reference unit position at preselected time intervals, which could be fractions of seconds or at minutes as desired and as indicated at 222. This received position indicating data will be stored in memory as shown at 224.

Also while the mobile unit is turned on, it will determine whether it is receiving an input from the operator, such as having the input button 158 pushed as indicated at 226. If the input button 158 or some other input is not being provided, the mobile unit will analyze the position indicating signals received from the external position indicating source, such as the GPSS to arrive at its own global position at 228. This global position will be converted to a relative coordinate position using the position indicating data provided by the reference unit at 230.

Once the relative coordinate position of the mobile unit is determined, that position will be compared with the predetermined boundary to determine if the mobile unit is within or without the allowed range of motion of the mobile unit at 232. The results of this determination will be compared with the stimulus criteria to determine if a stimulus is warranted at 234. For example, if a dog wearing a mobile unit on a collar approaches within five feet of the predetermined boundary, the stimulus criteria may require that an audible warning be sounded as at 236. If the dog is within one foot of the boundary, the stimulus criteria may direct the application of an electric shock, as at 238, through apparatus such as electrodes 118. Or, if the dog is not within the stimulus application range, then no stimulus will be applied as at 240. It will be understood that other forms of stimulus may be applied, as previously mentioned, depending upon the particular application of the present invention. Thus, the mobile unit may contain a vibration producing means as found in many current pagers or it may provide a visual display. The logic employed at 234 may also include steps to determine if the dog is returning from a foray outside the boundary. If so, then no stimulus may be employed until the animal has returned to the allowed area and is once again within the stimulus producing area.

As indicated at 232, the mobile unit will employ an algorithm to determine whether the mobile unit is within or without the predetermined boundary conditions. While there are many different analyses performed to make such a determination in accord with the present invention, herein follows one such method.

Thus, as shown at 250, initially the boundary coordinate vectors are calculated based upon the stored boundary coordinates, which will be stored as relative coordinates with respect to the reference unit. Thus for a total of i boundary coordinates, the boundary vectors for boundary coordinates i=1 to i−1, the boundary vectors $[BC]_i$ would be given by:

$$[BC]_i = [(X_{i+1}-X_i),(Y_{i+1}-Y_i)] = [BC_x, BC_y]_i. \quad (2)$$

In essence the foregoing equation provides that a boundary vector is drawn from the first boundary coordinate entered to the second, from the second to the third, and so on. For the last boundary coordinate i the boundary vector is drawn from the last coordinate entered to the first, thereby providing a completely enclosed boundary. This last boundary vector is given by:

$$[BC]_i = [(X_1-X_i),(Y_1-Y_i)] = [BCx, BCy]_i \quad (3)$$

As shown at 252, then, the object vectors of the mobile unit are calculated for each of the i stored boundary coordinates. That is, the position of the mobile unit relative to the boundary is determined by calculating vectors from the relative coordinate position of the mobile unit to each of the boundary coordinates. Thus these object vectors $[OV]_i$ are determined, for 1 to i boundary coordinates $(X_i, Y_i)$, and mobile coordinate $(X_m, Y_m)$ and are given by:

$$[OV]_i = [(X_m-X_i),(Y_m-Y_i)] = [OV_x, OV_y]_i. \quad (4)$$

After having determined the object vectors, the magnitude or amplitude of each of the object vectors is calculated and is given by $$OVM_i = (OV_{xi}^2 + OV_{yi}^2)^{1/2} \quad (5)$$

where xi and yi indicate the magnitudes of the x and y coordinates of the respective vector.

Referring now to 254, the scalar multipliers, $SM_i$ for each of the boundary vectors i are calculated as indicated below. Each scalar multiplier identifies the point along the boundary vector heading at which a normal vector, originating from the object coordinates, will intersect the boundary vector heading. For a scalar multiplier <0 or >1, the normal originating from the object coordinates will intersect the boundary vector heading at an imaginary point beyond the vectors determined length.

$$SM_i = ([BC]_i * [OV]_i)/([BC]_i * [BC]_i) \quad (6)$$

where "*" represents a dot product.

Another step in determining the position of the mobile unit relative to the boundary is to calculate the the vector normal $[N]_i$ as at 256 for each of the boundary vectors i, the vector normal being given by $$[N]_i = [(SM_i * BC_{xi}) - X_m, (SM_i * BC_{yi}) - Y_m] = [N_x, N_y]_i. \quad (7)$$

After the vector normals $[N_i]$ are determined, the vector normal magnitudes or amplitudes Ni for each of the boundary coordinates is calculated as at 256 and are given by $$N_i = (N_{xi}^2 + N_{yi}^2)^{1/2} \quad (8)$$

As another step, the range $R_i$ from the object coordinates to each i boundary vector is determined. First, the scalar multiplier for each coordinate is evaluated according to the following rules at 258:

$$\text{if } SM_i < 1 \text{ and } > 0, \text{ then } R_i = N_i \quad (9)$$

as indicated at 260. Otherwise as indicated at 262, $$R_i = OVM_i \quad (10)$$

As a further step, the included angle $\theta_i$ is determined for each boundary vector as at 264. That is, $\theta_i$ is the angle between adjacent object vectors. So for boundary vector $[BC]_i$, its included angle is that which is formed by object vectors $[OV]_i$ and $[OV]_{i+1}$. Thus, $$\theta_i = abs\{ARC\text{-}COSINE(N_i/OVM_i) \pm ARC\text{-}COSINE(N_i/OVM_{i+1})\} (11)$$

where + is used if $SM_i$ is <1 and >0, and − is used otherwise.

As another step, a sign convention must be applied to the calculated included angle, $\theta_i$ for each boundary vector. To assign the proper sign convention to the included angle $\theta_i$, the cross products of the boundary coordinate vectors $[BC]_i$ and the corresponding object vectors $[OV]_i$ is calculated as at 266 and as given by $$[BC]_i X [OV]_i \quad (12)$$

The results of each cross product calculation are examined and a sign convention is assigned as at 268 based upon the following rules:

$$+ \text{ if the cross product of } [BC]_i X [OV]_i \text{ is } >0 \quad (13)$$

$$- \text{ if the cross product of } [BC]_i X [OV]_i \text{ is } <0 \quad (14)$$

As another step in determining whether the mobile unit is within or without the allowed range, the minimum distance between the object coordinate and the boundary vectors is determined by finding the minimum value of the range set from 1 to i of $R_i$ as shown at 270. This number indicates the distance of the mobile unit from the nearest boundary.

As a final step in determining whether the object coordinates, that is, the mobile unit coordinates are within the predetermined boundary perimeter, the included angles $\theta_i$ are summed from 1 to i as at 272. The within/without condition of the mobile unit is then determined according to the following rules:

if the sum of $\theta_i=0$, the object coordinates (and thus the mobile unit)are outside of the boundary perimeter as indicated at 274;

if the sum of $\theta_i=2$ n$\pi$, where n is an integer, the object coordinates (and thus the mobile unit) are within the boundary perimeter as indicated at 276.

In summary, the included angles are determined and summed. If the result of the summation is 0, the mobile unit is outside the allowed area. If the result of the summation is a multiple of $2\pi$ then the mobile unit is within the allowed area. The stimulus application condition will be based upon whether the mobile unit is in or out of the containment area or boundary, and the minimum distance of the range set as calculated earlier. One example for stimulus may be that audible tones are emitted if the angles $\theta_i$ sum to a value other than 0, meaning the unit is still within the boundary and the minimum value of the range set is greater than 1 but less than 5 feet as an example only. An electric shock may be administered if the mobile unit is being worn by an animal and if the minimal value of the range set is less than one foot, for example. The appropriate ranges can be set as desired in accord with the present invention.

Referring back to 226 and to FIG. 11B now, if the input button is pushed, the built in logic of the microprocessor will compare the length of time that the button is pushed in with internal parameters. The length of time that the button 158 is depressed will determine the appropriate function to be executed. For example, where the button 158 is held in only briefly as at 300, the microprocessor of 100 will recognize that the power to the unit is to be turned off and will do so as at 302. Depressing the button 158 for longer time periods will indicate that a function relating to the stored boundary coordinates is to be performed. Thus, where the button is depressed for approximately three seconds as shown at 304, the microprocessor of 100 will be programmed to recognize that the teaching of external boundary coordinates is to follow as at 306. In such a circumstance and with the exemplary devices of FIGS. 8 and 9, the LED 156 can be lit steadily to provide an indication of that particular mode of operation.

Where the input button 158 is depressed for a longer period of time, such as for approximately 6 seconds, then the microprocessor of 100 will recognize that a programming of internal coordinates for internal islands is to occur as indicated at 308. Again, such a teaching function can be represented to the user by an external signal, visual (or auditory), such as by having LED 156 blink steadily as at 310.

Where the input button 158 is depressed for a longer period of time, such as nine seconds as indicated at 312, the microprocessor will remove previously stored coordinates from memory as at 314, thereby allowing the programming of new coordinates.

Where a "teaching function" is indicated as at 306 for external boundary coordinates or at 310 for internal boundary coordinates, a subsequent press of the button as at 316 will either allow various coordinates to be acquired and stored in the memory of the mobile unit or will cause the teaching function to be exited. Thus, where the button 158 is pushed briefly as at 318, mobile unit will acquire its global coordinate as from a GPS at 320 and will also receive the global position coordinate of the reference unit 70 from the reference unit as a 322. The differential position of the boundary co-ordinate will then be calculated using equation (1) given above as at 324. This relative position will then be stored in a non-volatile memory as at 326. A second and subsequent coordinates can then be entered following the same procedure. When the coordinates have all been entered, the input button 158 can then be depressed and held for the requisite length of time, three seconds if an external boundary is being programmed and six seconds if an internal boundary for an "island" is being programmed as at 328. The mobile unit 90 will then exit the "teach mode" as at 330 and the unit will substantially ready to function in accord with the present invention.

It will be understood that the mobile unit will be carried or otherwise transported to the vertices of the boundary and at each vertex the coordinates thereof will be entered into the mobile unit or other memory device. While the foregoing description of the operation of the mobile unit is an exemplary example of a device in accord with the present invention, the present invention and the following claims are not so limited. Thus, the present intention contemplates any device wherein the coordinates of a boundary are recorded and the position of a mobile unit is later checked relative thereto to determine whether the unit is within the predetermined boundary.

Figure 12:
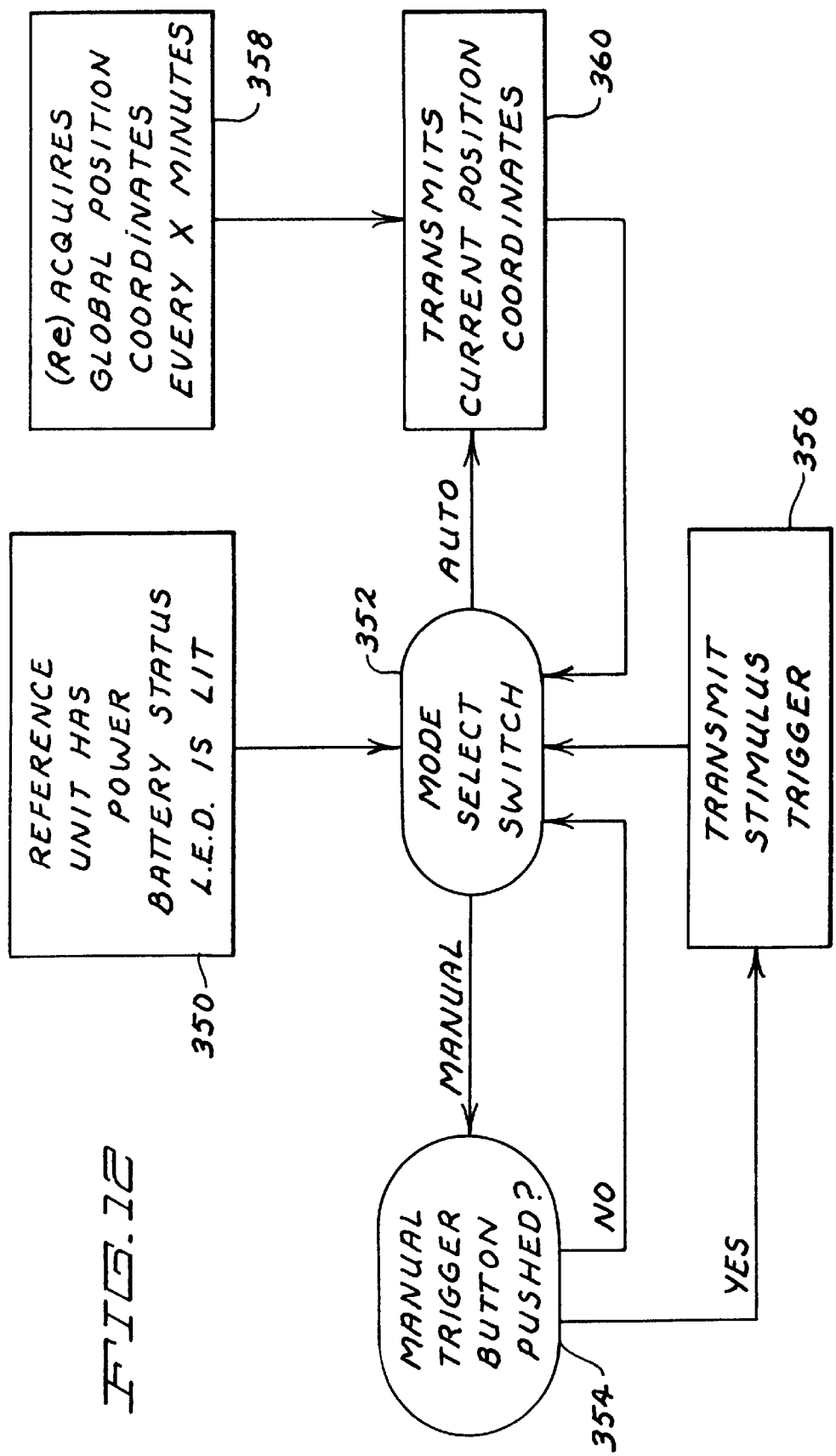
FIG. 12 is a block diagram of a flow chart for programming of a programmable microprocessor useful in a reference unit in accord with the present invention.

Referring now to FIG. 12, the functioning of a reference unit in accord with the present invention will now be described. The reference unit 70 will preferably have an indicator such as an LED to indicate whether the unit is powered as at 350. The mode is determined as at 352. If the unit is in manual operation mode, then the built in logic in the unit will determine whether the manual trigger button has been activated as by pushing it as at 354. If the manual trigger button has been activated, then a signal to apply a stimulus via the mobile unit will be transmitted thereto as at 356. This allows for manual training of a pet. If the manual trigger button is not activated or has been activated and then reactivated, the program will again check the mode to see if the operator has selected automatic mode at 352. If the automatic mode has been switched, the reference unit will acquire its position indicating data as at 358 and then transmit data indicating its position to the mobile unit as at 360. At preselected intervals the reference unit will check to see if the mode has again been switched from automatic to manual mode.

As noted, the reference unit will transmit position indicating data to the reference unit. Such data could be the actual GPS signals received by it or other position indicating signals. In addition, the reference unit could itself calculate its position based upon such signals and then transmit the actual calculated position coordinates.

Figure 13:
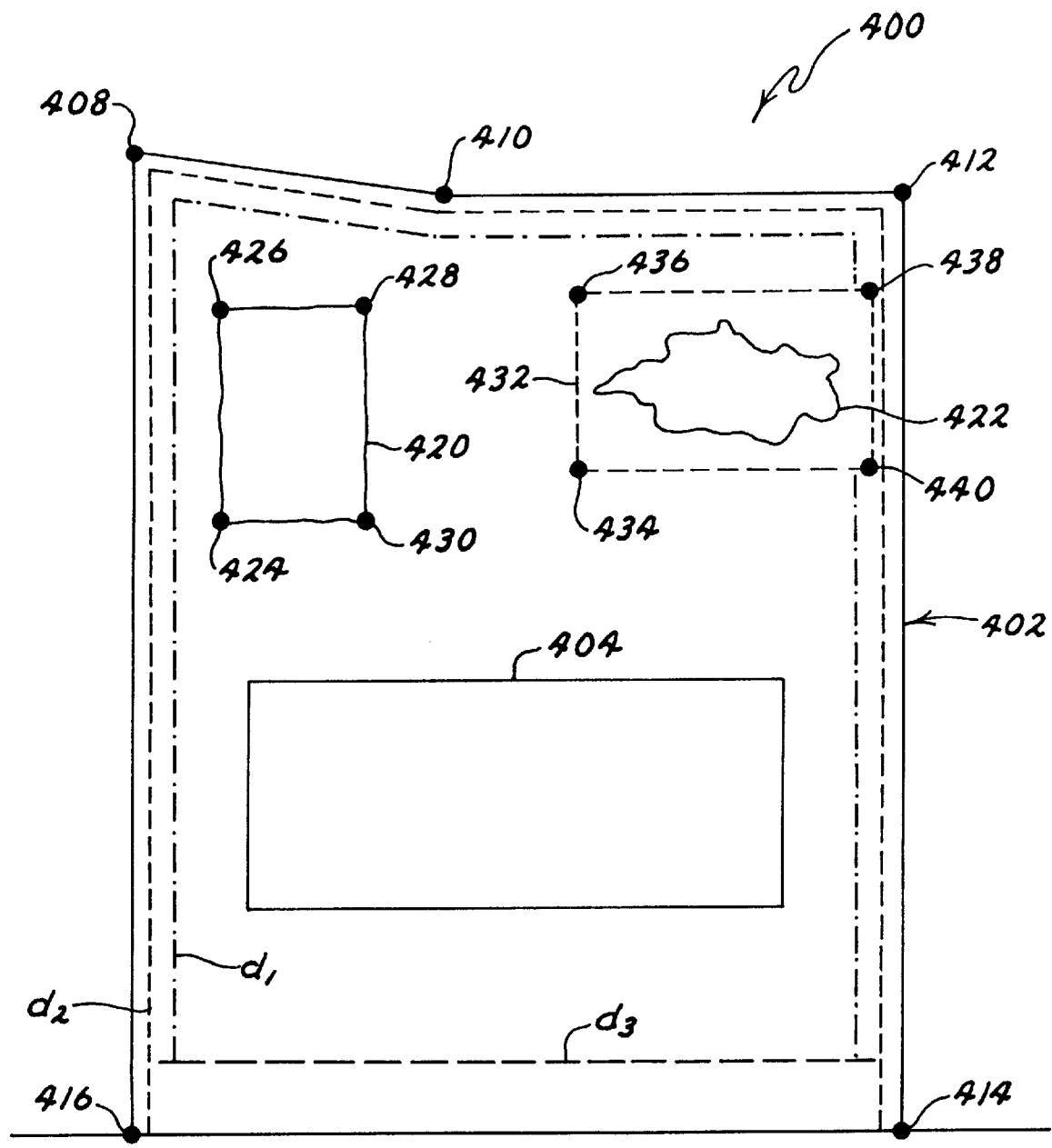
FIG. 13 is an illustration of one application of the present invention to a residential home.

An example of a boundary with "allowed areas," prohibited areas, and stimuli administering distances is shown in FIG. 13. FIG. 13 illustrates residential property 400 having a boundary or property line indicated at 402, and including a house 404. Boundary 402 includes a plurality of vertices, here labeled as 406–414. In the manner just described, these vertices could be taught to the mobile unit as an external boundary. If desired, however, because of the unique and advantageous flexibility of the present invention, a boundary line distinct from that of the actual property line could be designated since the input of the boundary coordinates is within the control of the operator of the mobile unit and does not depend upon the location of the property line. Thus, a boundary inside of the actual property line could be arbitrarily designated by the operator.

Also shown in FIG. 13 is a garden 420 and a new planting (or other prohibited area) 422. The garden 420 has vertices 424–430 which can be taught to the mobile unit as hereinbefore described. The other area 422 has a very irregular shape, the vertices of which can also be taught to the mobile unit. For simplicity, however, many operators will choose to define a regular geometrical boundary about such irregular shaped areas, as indicated by the dashed line rectangle 432 having vertices 434–440. The flexibility and utility of the present invention flows from the ability of the operator to define at will allowed and prohibited areas of movement and to provide stimulus to the wearer of the mobile unit, or, if being worn by a person or small child, for example, to enable the tracking of the person or child relative to the allowed range of movement.

Also shown in FIG. 13 are various stimulus application range. Thus, a first stimulus application range 450 is defined as a distance $d_1$ from the boundary 402. A second stimulus application range 452 is defined as a distance $d_2$ from the boundary 402. The distances $d_1$ and $d_2$ can be arbitrarily determined. Thus, if the mobile unit moves within a distance $d_1$ of the boundary 402, for example, then a particular stimulus, such as a vibration or audible tone may be applied to the wearer of the mobile unit. If the mobile unit is moved within a distance $d_2$ of the boundary, then a stronger stimulus may be applied. If desired, the present system is flexible so as to accommodate defining a third or more ranges such as $d_3$ along boundary segment 406–414, which may front a street for example, for application of a stronger stimulus immediately. It will be understood that similar stimulus application areas may be defined around prohibited areas 420 and 422 also, such areas being omitted here for the sake of clarifying the figure. It will be understood further that the example of a use of the present invention relative to FIG. 13 is meant to be illustrative only and that the present invention may be used with any other boundary geometries, external and internal.

It will be understood in reviewing FIG. 13, however, the many advantages of the present invention over the prior art. For example, if the garden 420 is removed in a subsequent year or if at the end of the harvesting season it is desired to return the area to the animal's use, then the internal boundaries can be retaught to the mobile unit. Furthermore, assuming friendly relations between neighbors, the boundary can be expanded beyond the actual property line to allow the pet the full use of the yard before a harsh stimulus such as an electric shock is applied to the animal. In such a circumstance, the actual property line may form the range at which the harsh stimulus is administered. If the family takes the pet on a vacation, a boundary can be defined as hereinbefore described at the vacation location and when the family returns, the old values for the external and internal boundaries can be entered back into the mobile unit. All of these "resettings" of the boundaries can occur without the need to bury or dig up a transmitter wire or in reliance on a device providing only a uniform boundary having a circular configuration.

Figure 14:
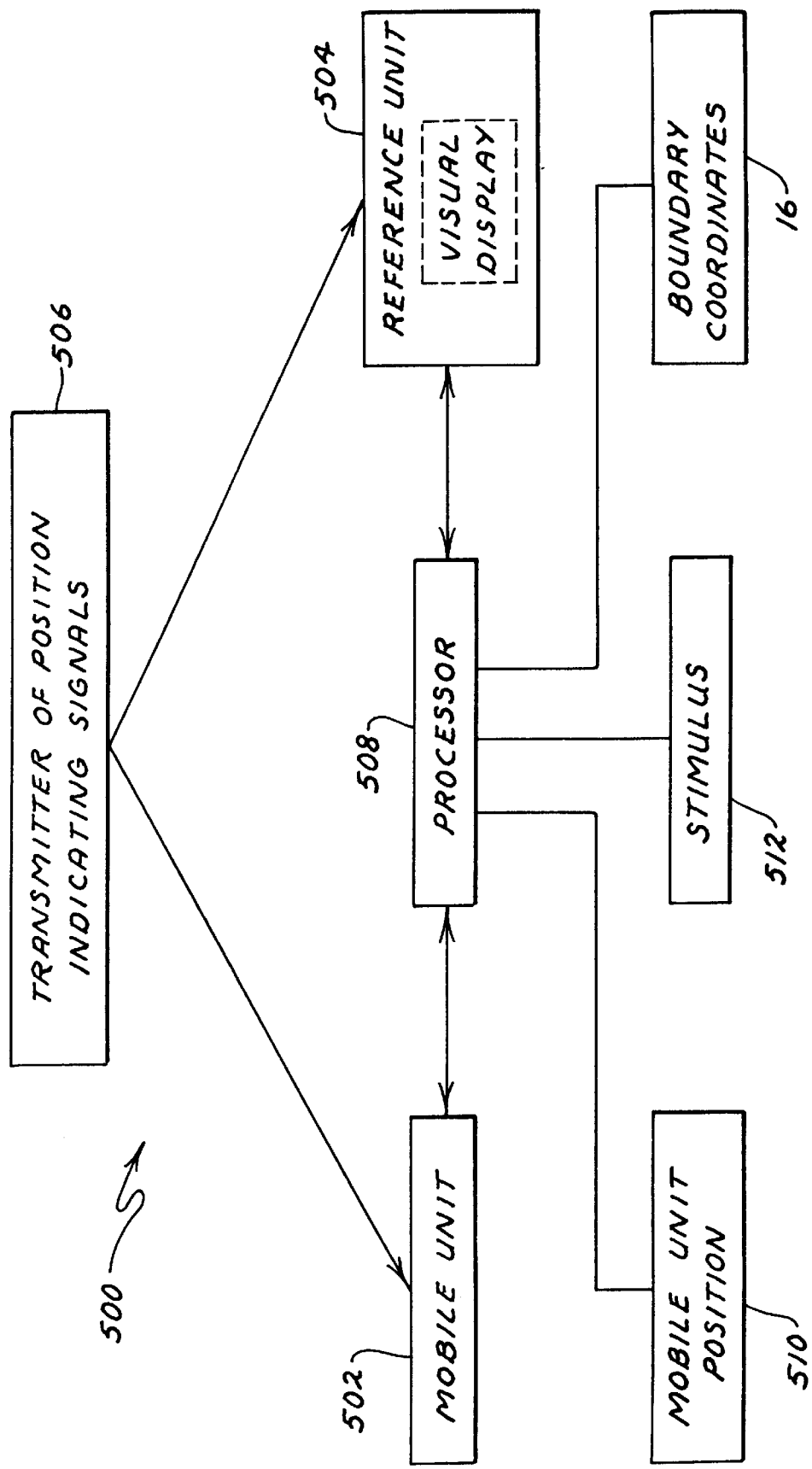
FIG. 14 is an illustration of the present invention and including an apparatus for providing a visual display.

More generally, the present invention can be described relative to FIG. 14. FIG. 14 shows a system 500 in accord with the present invention that includes a mobile unit 502 and a reference unit 504 both including receivers and receptive to position indicating signals broadcast by a remote transmitter 506. One of the units 502, 504 will include a processor 508 that determines the position of the mobile unit 502 and will compare it with the predetermined boundary coordinates. The processor 508 can be programmed to function in a desired manner dependent upon the results of the position determination. For example, it could cause the position to be displayed on a display device 510, which may be a computer monitor for example, and thus show the location of the mobile unit relative to the boundary. Or, as previously described, it could cause the application of a stimulus as at 512 to a person or animal wearing the mobile unit. The stimulus could be an auditory stimulus, such as a "beep" or a voice, a vibratory stimulus, a chemical stimulus, such as an odor, or an electrical shock.

It will be understood that the present invention has been described in relation to the teaching function occurring relative to the mobile unit. The present invention is not so limited however. The teaching function could also occur relative to the reference unit. The mobile unit would then transmit its position indicating data signals to the reference unit, which would process them and determine whether a stimulus was warranted. When the application of a stimulus was warranted the reference unit would transmit the appropriate signal to the mobile unit directing the application of the stimulus. Thus, a system and method in accord with the present invention could include a processor in either or both of the units. Typically, the reference unit will be permanently positioned at a single location once the teaching function is completed for a particular boundary. As another variation on the present invention, the system could include multiple taught boundaries. Thus, where a homeowner had two or more homes, the present invention could include sufficient memory and appropriate apparatus to switch as desired between the differing boundaries.

Furthermore, it will be understood that the present invention has been advantageously described with reference to use of GPSS. Any other position indicating broadcast signal such as GLOSNASS or LORAN could also function in accord with the present invention. It will also be understood that the signals exchanged between the reference and mobile or remote units could be the actual signals received by the units or calculated coordinate positions or any other signal indicating the position of the broadcasting unit.

Additionally, with regard to the embodiments of the present invention shown and described in the various figures, it will be understood that many different input devices for the mobile and reference units could be used with the present invention and that alternative indicators or additional indicators beyond the LEDs illustrated and shown herein could be used. For example, but without limitation, LEDS could be added that would be lit only when a particular mode of operation, such as manual, automatic, teaching external coordinates, or teaching internal coordinates LEDS to simplify the use of the inventive apparatus for the user, particularly the home user.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A method for locating an object relative to a predetermined external boundary and at least one internal boundary, said external boundary defining an allowed area of movement therewithin and said internal boundary defining at least one excluded area of movement within said allowed area of movement, said external and internal boundary each having a plurality of vertices, said method for locating using a reference unit, a mobile unit attached to and movable with the object, and position indicating data signals broadcast by a remote transmitter and receivable by the reference and mobile units, said method comprising:

receiving the position indicating data signals;

determining the respective global positions of the reference and mobile units;

determining the differential coordinate position of the mobile unit;

determining the respective global positions of a plurality of external boundary coordinates of the external boundary including at least the vertices of the external boundary;

determining the differential coordinate positions of at least the vertices of the external boundary;

determining the respective global positions of a plurality of internal boundary coordinates of the internal boundary including at least the vertices of the internal boundary;

determining the differential coordinate positions of at least the vertices of the internal boundary;

determining whether the mobile unit is within the allowed area by comparing the differential coordinate position of the mobile unit with the differential external and internal boundary coordinate positions.

2. The method of claim 1 wherein the mobile unit is worn by an animal and includes apparatus for administering a stimulus from the group including auditory, visual, chemical, vibratory, or electrical shock stimuli and said method further comprises:

determining a sequence of allowable distances within which the animal may approach the external boundary;

determining the distance of approach by the animal to the external boundary; and applying a stimulus to the animal in accord with the predetermined sequence.

3. The method of claim 1 wherein the mobile unit is worn by a person and includes apparatus for administering a stimulus from the group including auditory, visual, chemical, and vibratory stimuli and said method further comprises:

determining a sequence of allowable distances within which the person may approach the external boundary;

determining the distance of approach by the person to the external boundary; and applying a stimulus to the person in accord with the predetermined sequence.

4. The method of claim 1 and further including:

determining the distance of the mobile unit from the external boundary.

5. The method of claim 4 and further including administering a stimulus based upon the distance of the mobile unit from the external boundary.

6. The method of claim 1 and further including:

determining the distance of the mobile unit from the at least one internal boundary.

7. The method of claim 6 and further including:

determining the distance of the mobile unit from the external boundary.

8. The method of claim 6 and further including administering a stimulus based upon the distance of the mobile unit from the internal boundary.

9. The method of claim 1 and further including providing a system comprising the mobile unit, reference unit and remote transmitter comprise a system, wherein at least one of the reference or mobile units includes a processor, the processor converting said position indicating signals to global positions of the reference and mobile units and further determining a differential coordinate position for the units.

10. The method of claim 9 wherein the processor includes a memory, the memory storing the differential boundary coordinates of the external and internal boundaries.

11. The method of claim 10 and further including continuously determines the relative differential coordinates of the mobile unit.

12. The method of claim 10 wherein the processor compares said relative differential coordinates of the mobile unit with said relative differential external boundary coordinates to determine whether the mobile unit is with said predetermined external boundary.

13. The method of claim 12 wherein the processor determines the distance of the mobile unit from said predetermined external boundary and provides a stimulus application signal to the mobile unit directing the application of a stimulus to the wearer of the mobile unit.

14. The method of claim 10 and further including providing the differential boundary coordinates of the external and internal boundaries by moving the mobile unit to the boundary vertices of the external and at least one internal boundary and determining the global position of the boundary vertices by determining the global position of the mobile unit.

15. The method of claim 14 and further including calculating the external and internal boundaries based upon the global positions of the external and internal boundary vertices respectively.

16. A system for relating the position of a mobile unit to a predefined external boundary defining an area of allowed movement and at least one predefined internal boundary defining an area of excluded movement within said area of allowed movement, said system comprising:

a mobile unit;

a reference unit; and at least one remote transmitter provided for transmitting position indicating signals by which the positions of the mobile and reference units may be determined relative to the external and the at least one internal boundary;

wherein said mobile unit and said reference unit each include a receiver for receiving said position indicating signals and wherein said system further includes at least one processor for converting said position indicating signals into global coordinate positions of said reference and mobile units and for determining the distance of said mobile unit from said predetermined external boundary.

17. The system of claim 16 wherein said processor further determines the relative differential positions of said reference and mobile units.

18. The system of claim 16 wherein at least one of said reference or mobile units includes a said processor, said processor converting said position indicating signals to global converting positions of said reference and mobile units and further determining a differential coordinate position for said units.

19. The system of claim 18 wherein said processor includes a memory, said memory storing the differential boundary coordinates of the external and internal boundaries.

20. The system of claim 19 wherein said processor continuously determines the relative differential coordinates of said mobile unit.

21. The system of claim 20 wherein said processor compares said relative differential coordinates of said mobile unit with said relative differential external boundary coordinates to determine whether said mobile unit is with said predetermined external boundary.

22. The system of claim 21 wherein said processor determines the distance of said mobile unit from said predetermined external boundary and provides a stimulus application signal to the mobile unit directing the application of a stimulus to the wearer of the mobile unit.

23. The system of claim 19 wherein the differential boundary coordinates of the external and internal boundaries are provided to said memory by moving the mobile unit to the boundary vertices of the external and at least one internal boundary and determining the global position of the boundary vertices by determining the global position of the mobile unit.

24. The system of claim 23 wherein said processor calculates the external and internal boundaries based upon the global positions of the external and internal boundary vertices respectively.

* * * * *

UNITED STATES PATENT AND TRADEMARK OFFICE
CERTIFICATE OF CORRECTION

PATENT NO.   : 5,949,350  
DATED        : September 7, 1999  
INVENTOR(S)  : Girard et al.

It is certified that error appears in the above-identified patent and that said Letters Patent is hereby corrected as shown below:

<u>Title page,</u>
Item [73], Assignee, please delete "Glencoe, Mich." and add -- Glencoe, Minnesota --.

Signed and Sealed this

Fifteenth Day of October, 2002

Attest:

JAMES E. ROGAN
Attesting Officer     Director of the United States Patent and Trademark Office